US011591957B2

(12) United States Patent
Howitt

(10) Patent No.: US 11,591,957 B2
(45) Date of Patent: Feb. 28, 2023

(54) ENERGY STORAGE APPARATUS AND METHOD

(71) Applicant: TES CAES TECHNOLOGY LIMITED, Stoke-on-Trent (GB)

(72) Inventor: Mark Aidan Howitt, Stoke-on-Trent (GB)

(73) Assignee: TES CAES TECHNOLOGY LIMITED, Stoke-on-Trent (GB)

( * ) Notice: Subject to any disclaimer, the term of this patent is extended or adjusted under 35 U.S.C. 154(b) by 315 days.

(21) Appl. No.: 16/758,780

(22) PCT Filed: Oct. 23, 2018

(86) PCT No.: PCT/GB2018/053063
§ 371 (c)(1),
(2) Date: Apr. 23, 2020

(87) PCT Pub. No.: WO2019/081916
PCT Pub. Date: May 2, 2019

(65) Prior Publication Data
US 2021/0164395 A1    Jun. 3, 2021

(30) Foreign Application Priority Data

Oct. 24, 2017  (GB) ..................................... 1717452

(51) Int. Cl.
*F02C 6/16* (2006.01)
*F02C 7/143* (2006.01)

(52) U.S. Cl.
CPC ............... *F02C 6/16* (2013.01); *F02C 7/143* (2013.01); *F05D 2220/32* (2013.01); *F05D 2260/213* (2013.01); *F05D 2260/42* (2013.01)

(58) Field of Classification Search
CPC ................................... F02C 6/16; F02C 7/143
See application file for complete search history.

(56) References Cited

U.S. PATENT DOCUMENTS

| 4,523,432 A | 6/1985 | Frutschi |
| 2010/0251712 A1 | 10/2010 | Nakhamkin |

(Continued)

FOREIGN PATENT DOCUMENTS

| CH | 714713 | 9/2019 |
| CN | 10266117 | 9/2012 |

(Continued)

OTHER PUBLICATIONS

Machine translation of DE 102010055750 A1, accessed Sep. 26, 2022. (Year: 2022).*

(Continued)

*Primary Examiner* — Jonathan R Matthias
(74) *Attorney, Agent, or Firm* — Jeffer Mangels Butler & Mitchell LLP; Brennan C. Swain, Esq.

(57) ABSTRACT

An energy storage apparatus that includes at least one inlet for incoming process gas, at least one outlet for expanded process gas and a plurality of energy storage sub-systems configured to be arranged in series with each other and with a compressed gas store. The first of the plurality of energy storage sub-systems includes a first compressor, a first expander, a first thermal store and a first heat transfer device associated with the first thermal store. The second of the plurality of energy storage sub-systems includes a second compressor, at least a second expander, a second thermal store and a second heat transfer device associated with the second thermal store.

24 Claims, 5 Drawing Sheets

(56) References Cited

U.S. PATENT DOCUMENTS

| | | | |
|---|---|---|---|
| 2011/0094231 A1 | 4/2011 | Freund | |
| 2012/0174569 A1 | 7/2012 | Ingersoll | |
| 2013/0042601 A1 | 2/2013 | Kraft | |
| 2016/0216044 A1 | 7/2016 | Narine et al. | |

FOREIGN PATENT DOCUMENTS

| | | |
|---|---|---|
| DE | 10236325 | 2/2003 |
| DE | 202005003611 | 5/2005 |
| DE | 102010055750 | 6/2012 |
| DE | 102014008120 | 12/2015 |
| DE | 102014118466 | 1/2017 |
| EP | 0079624 A1 | 4/1982 |
| EP | 2447505 A2 | 5/2012 |
| EP | 2450549 | 5/2012 |
| EP | 2574739 | 4/2013 |
| EP | 2687702 | 1/2014 |
| EP | 2494166 | 3/2015 |
| EP | 2876282 | 5/2015 |
| EP | 2902604 | 8/2015 |
| EP | 2494167 | 11/2016 |
| EP | 2494169 | 11/2017 |
| EP | 3296546 A1 | 3/2018 |
| EP | 3428425 | 1/2019 |
| EP | 2880274 | 4/2019 |
| EP | 3230571 | 10/2019 |
| EP | 3458791 | 2/2020 |
| ES | 2423973 | 9/2014 |
| FR | 2964693 | 3/2012 |
| FR | 3016025 | 12/2015 |
| FR | 3018318 | 2/2016 |
| FR | 3023320 | 3/2017 |
| FR | 3023321 | 3/2017 |
| FR | 2981400 | 6/2017 |
| FR | 3051549 | 6/2018 |
| FR | 3014182 | 11/2018 |
| FR | 3069019 | 1/2019 |
| FR | 3074844 | 6/2019 |
| FR | 3074845 | 6/2019 |
| FR | 3074846 | 12/2019 |
| GB | 2493791 A | 2/2013 |
| WO | 2011053411 A1 | 5/2011 |
| WO | WO13045463 | 4/2013 |
| WO | 2015015184 A2 | 2/2015 |
| WO | WO15091329 | 6/2015 |
| WO | WO16000133 | 1/2016 |
| WO | WO16001000 | 1/2016 |
| WO | WO16001001 | 1/2016 |
| WO | WO16120750 | 8/2016 |
| WO | WO16203979 | 12/2016 |
| WO | WO16203980 | 12/2016 |
| WO | WO17093768 | 6/2017 |
| WO | WO19011593 | 1/2019 |
| WO | WO19081916 | 5/2019 |
| WO | WO19115119 | 6/2019 |
| WO | WO19115120 | 6/2019 |
| WO | WO19115121 | 6/2019 |
| WO | WO20007798 | 1/2020 |

OTHER PUBLICATIONS

International Search Report and Written Opinion issued in PCT/GB2018/053063.
https://web.archive.org/web/20170709032607://storelectric.com/how-caes-works.html.
Search Report issued in GB1717452.5 dated Jan. 5, 2018.
Search Report issued in GB1512973.7 dated Sep. 25, 2015.
International Preliminary Report on Patentability dated Apr. 28, 2020.

* cited by examiner

ENERGY STORAGE APPARATUS AND METHOD

FIELD OF THE INVENTION

The present invention relates to an energy storage apparatus and method, and in particular to a compressed air energy storage apparatus and method.

BACKGROUND

Compressed Air Energy Storage (CAES) is well known, having been first implemented on a large scale at Huntorf in Germany in 1978. In such a system, electricity is converted into compressed air energy using compressors. The compressed air is then stored, in Huntorf's case in salt caverns beneath the plant. When electricity is wanted from the plant, the compressed air is expanded to generate (or to help generate) it, that is, for the electricity regeneration process. In Huntorf's case, the regeneration process is achieved by mixing compressed air with natural gas and then feeding this mixture into a gas turbine to generate electricity: the addition of the compressed air increases the efficiency of the gas turbine. There has been a similar implementation since 1992 in Macintosh, Ala., USA. Many similar schemes have been proposed but not implemented since.

During compression, significant amounts of heat are generated. Likewise, during expansion the air needs to absorb significant amounts of heat if it is not to be very cold. This is inescapable due to the first law of thermodynamics, and reduces the intrinsic efficiency of CAES as measured by the ratio of electricity out to electricity in. Therefore in order to increase the intrinsic efficiency of CAES, some or all of the heat generated during compression must be stored, and re-used later to heat (whether wholly or partially) the air as it expands, or during the generation process, or in the exhaust process following generation.

The Adele Project, proposed in the year 2000 by GE of America and RWE of Germany, envisages a system whereby this heat is stored in a solid heat store, such as one comprising bricks, stones or ceramic materials. The hot compressed air is passed through the solid heat store and transfers much of its heat to it. During the energy recovery process the cooled compressed air is passed back through the heat store, heating it up prior to electricity regeneration. Because the heat transfer, storage and recovery process is never perfect, supplementary heating is provided. All this has been in the public domain since the year 2000.

WO-A-2011/053411 describes an adiabatic CAES system wherein, during the charging part of the cycle, a thermal energy storage (TES) subsystem receives heat from the compressed air after each stage of compression, by transferring the heat through a heat exchanger into a liquid medium. This medium is stored in a single container, from which it is extracted in order to heat the air during the discharging part of the cycle by heat transfer through heat exchangers prior to the air entering each turbine.

Such an arrangement requires very careful balancing of the system. Firstly, all compression stages must have substantially the same compression ratio as each other, otherwise the temperature of the TES fluid would be substantially different exiting each heat exchanger during the compression cycle, and heat the air with differing amounts of adequacy at each stage of the expansion cycle. Secondly, all expansion or turbine stages must have substantially the same expansion ratio as each other, otherwise they would either require pre-heating to different temperatures or output the expanded air at substantially different temperatures at each stage, leading to inefficiencies of excessively hot and/or cold air at different states. Thirdly, all heat exchangers are after compressors and before turbines, whereas they may be constructed more economically as multi-stage compressors with intercoolers and multi-stage turbines with interheaters. Fourthly, no provision is made for providing additional heat to compensate for thermal losses during heat transfer and storage. Fifthly, TES fluid temperatures need to be kept below boiling point, and therefore compression and expansion ratios need to be kept low, because the TES system is not pressurised. Sixthly, the system does not envisage the conversion of other forms of energy to and from compressed air and heat.

DE-A-102010/055750 envisages using a saline solution (various saline solution options are cited) at ambient pressure in order to reduce the capital cost of the plant. This restricts the temperature to which the TES fluid can be heated, which in turn restricts the available compression and expansion ratios. This document also envisages the use of a single TES fluid store, which has the same draw-backs of requiring very careful system balancing as described in the previous paragraph.

As such, existing energy storage apparatuses tend to be complex systems, requiring careful balancing as described above, which can make the apparatuses difficult and expensive to implement and run. The complexity also makes them more prone to problems arising, which can lead to heat and energy inefficiencies, and to high operating and maintenance costs, which is all clearly detrimental to the function of an apparatus whose purpose is to store energy cost-effectively.

It would be desirable to provide an energy storage apparatus and method that overcomes one or more problems associated with existing compressed air energy storage systems, whether discussed above or otherwise.

SUMMARY OF THE INVENTION

Any one or more features described in relation to one aspect, embodiment, apparatus or method described herein may be combined with any other aspect, embodiment, apparatus or method described herein, as appropriate and applicable.

Any advantage stated herein for a feature or group of features from any aspect, embodiment, apparatus or method described herein is applicable wherever this same feature or group of features is elsewhere described.

According to a first aspect of the present invention there is provided an energy storage apparatus comprising:
  at least one inlet for incoming process gas;
  at least one outlet for expanded process gas; and
  a plurality of energy storage sub-systems configured to be arranged in series
  with each other and with a compressed gas store;
  wherein a first one of the plurality of energy storage sub-systems comprises:
    at least a first compressor;
    at least a first expander;
    at least a first thermal store; and
    at least a first heat transfer device associated with the first
    thermal store; and
  wherein a second one of the plurality of energy storage sub-systems comprises:
    at least a second compressor;
    at least a second expander;
    at least a second thermal store; and at least a second heat transfer device associated with the second thermal store, wherein the first heat transfer device is configured to transfer heat generated by compression of the process gas in either the first or the second compressor to the first thermal store for storing the heat in the first thermal store, and wherein the first heat transfer device is configured to transfer heat from the first thermal store to process gas received at the first or the second expander;

and wherein the second heat transfer device is configured to transfer heat generated by compression of the process gas in the first or the second compressor to the second thermal store for storing the heat in the second thermal store, and wherein the second heat transfer device is configured to transfer heat from the second thermal store to process gas received at the first or the second expander;

and wherein:

the first at least one compressor is configured to provide a first compression to incoming process gas received from the at least one inlet and to supply a first compressed process gas to the second compressor;

the second at least one compressor is configured to provide a second compression to the first compressed process gas received from the first compressor and to supply a second compressed process gas to the compressed gas store;

the second at least one expander is configured to provide a first expansion to the second compressed process gas received from the compressed gas store and to supply a first expanded process gas to the first expander; and the first at least one expander is configured to provide a second expansion to the first expanded process gas received from the second compressor and to supply a second expanded process gas to the at least one outlet.

There may be more such stages of compression and expansion.

For example, there may be any further number, for example one or two or three or more, of energy storage sub-systems configured to be arranged in series with the other energy storage sub-systems and with the compressed gas store, between the first and the second energy storage sub-systems. Any further energy storage sub-system may comprise at least a further compressor; at least a further expander; at least a further thermal store, and at least a further heat transfer device associated with the further thermal store, each being configured to be arranged, and/or configured, in a corresponding manner to the corresponding features of the first and second energy storage sub-systems.

Each compression/expansion stage (i.e. between heat exchangers) may comprise one or more actual compressors/stages of a multistage compressor (or expander).

Each compressor may form part of an input transducer configured to convert an input energy to compressed process gas and each expander may form part of an output transducer configured to convert compressed process gas to an output energy.

The number of stages of compression may be optimised in consideration of two or more of the pressure of the compressed gas store, the temperature of the thermal store, some other relevant criterion, and the natural compression/expansion ratio(s) of the compressors/expanders, such "natural" compression/expansion ratio(s) being "natural" by dint of their being standard (e.g. off-the-shelf, catalogue) designs/equipment.

Such a combination of features provides for an efficient, reliable and more simplified energy storage apparatus. Having the plurality of energy storage sub-systems arranged in this way prevents the need to match the compression and expansion ratios of all of the compressors and expanders respectively across the entire apparatus, which can be difficult and more costly. In the business of energy storage, cost, reliability and efficiency are of primary importance.

Such an arrangement can also be used to optimise thermal transfer between the compression and expansion stages within each of the sub-systems by matching the amount of heat output from the compression stage with the amount of heat required by the expansion stage within each of the sub-systems. By providing a plurality of energy storage sub-systems within the apparatus in this way, the temperature at which each of these sub-systems operates can be finely-tuned to keep them at temperatures that are easier to maintain, which can improve energy efficiency. In addition the thermal stores can be individually optimised to operate at a temperature for which a thermal store is more cost effective to construct.

Each of the sub-systems can also be used to compress and expand the air by different amounts. Again, this can reduce the amount of careful balancing that needs to be undertaken across the apparatus, simplifying and reducing the costs associated with implementing and maintaining the apparatus, whilst still providing for efficient compression and expansion.

Furthermore, the use of at least one thermal store within each of the plurality of compressor and expander arrangements, allows heat from compression to be stored and re-used during expansion, reducing or eliminating the need for any additional external energy that may otherwise be required during expansion to prevent freezing or localised changes to atmospheric conditions. Heat storage and re-use in this way also enables the use of a wider range of types of expander since they do no need to operate under such cold conditions. This can help further reduce implementation and maintenance costs.

Re-using the heat in this way also prevents or reduces the need to provide any additional heating source. If the additional heating were from renewable sources, this demand for additional heating occurs at a time when the apparatus is generating because of an insufficient energy supply and so this would put a substantial drain on the apparatus. If the additional heating were from burning fossil fuels, then the apparatus avoids or reduces emissions of greenhouse gases and other pollutants. In either case, this apparatus reduces the capital costs of providing such heating to the apparatus including, in the latter case, getting the fossil fuels to the apparatus (e.g. by laying gas pipes).

Re-using the heat in this way also provides for ongoing revenue savings from: (a) no longer having to buy the heating fuel (or not having to buy as much of it); (b) not paying (or paying less) for its transportation to sites (e.g. grid access charges for gas and electricity); (c) not paying (or paying less) emissions taxes/charges; (d) not paying (or paying less) pollution taxes/charges/clean-up costs/consequential costs (e.g. compensation); (e) supporting the energy transition from fossil to renewable fuels to reduce/eliminate emissions; and (f) enhancing/maintaining corporate image/reputation.

The apparatus may provide for cross linking thermal stores and compressors and/or expanders which may provide for a more customisable apparatus. The first heat transfer device may be configured to transfer heat generated by compression of the process gas in the first compressor via a first heat transfer conduit to the first thermal store for storing the heat in the first thermal store, and the first heat transfer device may be configured to transfer heat from the first thermal store to process gas received at the first expander via the first heat transfer conduit; and the second heat transfer device may be configured to transfer heat generated by compression of the process gas in the second compressor via a second heat transfer conduit to the second thermal store for storing the heat in the second thermal store, and the second heat transfer device may be configured to transfer heat from the second thermal store to process gas received at the second expander via the second heat transfer conduit.

A compression ratio of the first at least one compressor may be substantially equal to an expansion ratio of the first at least one expander, and a second compression ratio of the second at least one compressor may be substantially equal to a second expansion ratio of the second at least one expander. This may provide for a more energy efficient apparatus.

The first heat transfer device may be configured to transfer heat generated by compression of the process gas in the first compressor to the first thermal store for storing the heat in the first thermal store, and the first heat transfer device may be configured to transfer heat from the first thermal store to process gas received at the second expander.

The compression ratio of the first compressor may be substantially equal to the second expansion ratio of the second expander.

The second heat transfer device may be configured to transfer heat generated by compression of the process gas in the second compressor to the second thermal store for storing the heat in the second thermal store, and the second heat transfer device may be configured to transfer heat from the second thermal store to the first expanded process gas received at the first expander.

The compression ratio of the second compressor may be substantially equal to the expansion ratio of the first expander.

Each compressor, expander, thermal store and/or heat transfer device herein described may comprise one or more pieces of compression, expansion, thermal storage and/or heat transfer apparatus, operating in parallel and/or in series. And whereas only two stages of compression/expansion/storage are described, there may be any number of such stages of compression/expansion/storage.

The energy storage apparatus may be configured to selectively change the heat transfer communication between the compressors, the expanders, and the heat transfer devices, such that the first compressor and/or the first expander are selectively operable to be in heat transfer communication with the first heat transfer device or the second heat transfer device, and wherein the second compressor and/or the second expander are selectively operable to be in heat transfer communication with the first heat transfer device or the second heat transfer device. Such an operation between one stage of compression and a different stage of expansion may be referred to herein as "cross-linking". If cross-linking is undertaken, then cross-linked expanders and compressors may be of substantially equal compression ratio. This may provide for a more customisable apparatus with greater flexibility during operation.

The first and second thermal stores may be thermal fluid stores for holding a thermal energy fluid for storing heat. Said transfer of heat by the first and second heat transfer devices may comprise movement of said thermal energy fluid along one or more conduits carrying said thermal energy fluid. The thermal energy fluid may be water. The conduits and other equipment may be configured to contain the thermal energy fluid at higher pressure than atmospheric, which may be done in order to enable such thermal storage/conduit system to operate at a higher temperature.

Water could include salts or other elements/compounds dissolved in the water. The thermal energy fluid could be brine. The water could alternatively be pure. The thermal energy fluid could be oil, or any other suitable fluid.

Heat may alternatively be transferred via gases and/or solids.

The first thermal store and the second thermal store may be pressurised, optionally at a pressure of 10-30 bar, optionally at a pressure of 15-25 bar, optionally at a pressure of 18-22 bar. They may be pressurised to allow superheated liquid (e.g. water) to be present in the thermal stores. The first thermal store and/or the second thermal store may be pressurised at a pressure of less than 30 bar.

One benefit of using a pressurised fluid within the thermal store as the heat storage medium is that the specific heat capacity of the fluid may increase with pressure meaning that a particular volume of fluid is capable of storing more heat if it is at an elevated pressure, as elevated pressures permit elevated temperatures. This means that less volume of fluid can be used to store a particular amount of heat. It also means that, as higher temperatures are stored, so the heat losses during heat and fluid transfer and/or storage are reduced as a proportion of the heat stored, thereby improving efficiency.

The first thermal store and the second thermal store may be kept at a temperature of between approximately 150-250° C., optionally between 170-230° C.

The first thermal store may comprise a first hot portion and a first cold portion, wherein the first heat transfer device is configured to transfer heat generated by compression of the process gas in one of the compressors to the first hot portion, and wherein the first heat transfer device is configured to transfer cold from the first cold portion to the process gas output by one of the compressors for cooling the process gas.

The second thermal store may comprise a second hot portion and a second cold portion, wherein the second heat transfer device is configured to transfer heat generated by compression of the process gas in one of the compressors to the second hot portion. The second heat transfer device may be configured to transfer cold from the second cold portion to the process gas output by one of the compressors for cooling the process gas. Any one heat storage device may be configured either to contain only hot or only cold fluid, or to contain fluid that is hot in one part of the device and cold in another part of the device. "Hot" and "cold" are defined in comparison with each other.

The first heat transfer device may further comprise a first cooler configured to receive heat from the first thermal store and reduce said heat received from the first thermal store before supplying it to process gas during or after the process gas passes through one of the compressors.

The second heat transfer device may further comprise a second cooler configured to receive heat from the second thermal store and reduce said heat received from the second thermal store before supplying to process gas during or after the process gas passes through one of the compressors.

Providing such additional cooling may help overcome thermodynamic losses in the system. The additional cooling may be forced cooling.

The first cooler may be configured to receive heat from the first cold portion. In addition or alternatively, the second cooler may be configured to receive heat from the second cold portion.

The first compressor and second compressor may be mechanically linked to one another by a first linkage. For example, the first and second compressors may be arranged on a first shaft. The first and second expanders may be mechanically linked to one another by a second linkage. For example, the first and second expanders may be arranged on a second shaft.

The first and second compressors and the first and second expanders may all be mechanically linked to one another by a first linkage. For example, the first and second compressors and the first and second expanders may all be arranged on a single shaft, in which case clutches or comparable arrangements may be required such that the compressors disengage during expansion, and the expanders disengage during compression.

One or more, or all of the energy storage sub-systems may comprise a heating arrangement configured to supply heat to the process gas received at one of the at least one expanders. Any suitable type of heating arrangement may be used. Use of an additional heating arrangement may increase the output duration. One possible heating arrangement may be a burner for burning hydrogen. The first heat transfer device may comprise a first heat exchanger and a second heat exchanger, wherein the first heat exchanger is configured to transfer heat generated by compression of the process gas in either the first or the second compressor to the first thermal store for storing the heat in the first thermal store, and wherein the second heat exchanger is configured to transfer heat from the first thermal store to process gas received at the first or the second expander. The heat exchangers may be any other means for transferring heat.

The second heat transfer device may comprise a third heat exchanger and a fourth heat exchanger, wherein the third heat exchanger is configured to transfer heat generated by compression of the process gas in either the first or the second compressor to the second thermal store for storing the heat in the second thermal store, and wherein the fourth heat exchanger is configured to transfer heat from the second thermal store to process gas received at the first or the second expander. The heat exchangers may be any other means for transferring heat.

The energy storage apparatus may comprise a further energy storage sub-system comprising:
at least a further compressor;
at least a further expander;
at least a further thermal store; and
at least a further heat transfer device associated with the further thermal store, wherein the further heat transfer device is configured to transfer heat generated by compression of the process gas by either the first, the second or the further compressor to the further thermal store for storing in the further thermal store, and wherein the further heat transfer device is configured to transfer heat from the further thermal store to process gas received at the first, the second or the further expander;
and wherein:
the first compressor is configured to supply said first compressed process gas to the second compressor via the further compressor, the further compressor configured to further compress the first compressed process gas before it is supplied to the second compressor;
the second expander is configured to supply said first expanded process gas to the first expander via the further expander, the further expander configured to further expand the first expanded process gas before it is supplied to the first expander.

In a second aspect of the present invention, there is provided a method of storing energy using an energy storage apparatus, the energy storage apparatus comprising:
at least one inlet for incoming process gas;
at least one outlet for expanded process gas; and
a plurality of energy storage sub-systems configured to be arranged in series with each other and with a compressed gas store;
wherein a first one of the plurality of energy storage sub-systems comprises:
at least a first compressor;
at least a first expander;
at least a first thermal store; and
at least a first heat transfer device associated with the first thermal store;
and wherein a second one of the plurality of energy storage sub-systems comprises:
at least a second compressor;
at least a second expander;
at least a second thermal store; and
at least a second heat transfer device associated with the second thermal store,
wherein each compressor forms part of an input transducer and each expander forms part of an output transducer;
wherein the method comprises:
an input energy being supplied to said input transducer;
the first compressor providing a first compression to incoming process gas received from the at least one inlet and supplying a first compressed process gas to the second compressor;
one of the first and second heat transfer devices transferring heat generated by compression of the process gas in the first compressor to its associated thermal store for storing the heat in the associated thermal store;
the second compressor providing a second compression to the first compressed process gas received from the first compressor and supplying a second compressed process gas to the compressed gas store;
one of the first and second heat transfer devices transferring heat generated by compression of the process gas in the second compressor to its associated thermal store for storing the heat in the associated thermal store;
one of the first and second heat transfer devices transferring heat from its associated thermal store to the second compressed process gas received at the second expander from the compressed gas store;
the second expander providing a first expansion to the second compressed process gas received from the compressed gas store and supplying a first expanded process gas to the first expander;
one of the first and second heat transfer devices transferring heat from its associated thermal store to the first compressed process gas received at the first expander from second expander; and
the first expander providing a second expansion to the first expanded process gas received from the second expander and supplying a second expanded process gas to the at least one outlet; and
said output transducer outputting an output energy.

The method may further comprise:
the first heat transfer device transferring heat generated by compression of the process gas in the first compressor via the first heat transfer conduit to the first thermal store for storing the heat in the first thermal store;
the second heat transfer device transferring heat generated by compression of the first compressed process gas in the second compressor via the second heat transfer conduit to the second thermal store for storing the heat in the second thermal store;
the second heat transfer device transferring heat from the second thermal store to the second compressed process gas received at the second expander from the compressed gas store via the second heat transfer conduit;
the first heat transfer device transferring heat from the first thermal store to the first expanded process gas received at the first expander from the second expander via the first heat transfer conduit.

The first heat transfer device may transfer heat generated by compression of the process gas in the first compressor to the first thermal store for storing the heat in the first thermal store, and wherein the first heat transfer device may transfer heat from the first thermal store to process gas received at the second expander.

The second heat transfer device may transfer heat generated by compression of the process gas in the second compressor to the second thermal store for storing the heat in the second thermal store. The second heat transfer device may transfer heat from the second thermal store to the first expanded process gas received at the first expander.

The thermal store and second thermal store may be at a pressure of 10-30 bar, optionally at a pressure of 15-25 bar, optionally at a pressure of 18-22 bar; and wherein the method may further comprise pressurising the first thermal store and the second thermal store.

The first thermal store may comprise a first hot portion and a first cold portion, and the first heat transfer device may transfer heat generated by compression of the process gas in one of the compressors to the first hot portion, and wherein the first thermal store may transfer cold from the first cold portion to the process gas output by one of the compressors for cooling the process gas.

The second thermal store may comprise a second hot portion and a second cold portion, wherein the second heat transfer device transfers heat generated by compression of the process gas in one of the compressors to the second hot portion, and wherein the second heat transfer device transfers cold from the second cold portion to the process gas output by one of the compressors for cooling the process gas. Any one heat storage device may be configured either to contain only hot or only cold fluid, or to contain fluid that is hot in one part of the device and cold in another part of the device. "Hot" and "cold" are defined in comparison with each other.

The first heat transfer device may further comprise a first cooler which receives heat from the first thermal store and reduces said heat received from the first thermal store before supplying cold to the process gas during or after it passes through one of the compressors. Alternatively or additionally, a cooler may cool the cold thermal energy fluid before it is stored. The benefits of such cooler(s) include to reduce the temperature of the cold fluid prior to its use to cool the compression of the process gas, thereby rendering such compression and related thermal storage more efficient.

The second heat transfer device may comprise a second cooler which receives heat from the second thermal store and reduces said heat received from the second thermal store before supplying to process gas during or after it passes through one of the compressors. Alternatively or additionally, a cooler may cool the cold thermal energy fluid before it is stored.

The first cooler may receive heat from the first cold portion. The second cooler may receive heat from the second cold portion.

The first compressor and the second compressor may be mechanically linked to one another by a first linkage. The first linkage may be a first shaft. The first and second expanders may be mechanically linked to one another by a second linkage. The first and second expanders may be arranged on a second shaft.

The first and second compressors and the first and second expanders may all be mechanically linked by a first linkage. The first and second compressors and first and second expanders may all be arranged on a single shaft.

One of the first and third heat exchangers may transfer heat generated by compression of the process gas in the first compressor to its associated thermal store for storing the heat in the associated thermal store;
one of the first and third heat exchangers may transfer heat generated by compression of the process gas in the second compressor to its associated thermal store for storing the heat in the associated thermal store;
one of the second and fourth heat exchangers may transfer heat from its associated thermal store to the second compressed process gas received at the second expander from the compressed gas store; and/or
one of the second and fourth heat exchangers may transfer heat from its associated thermal store to the first compressed process gas received at the first expander from the second expander.

The first compressor may supply said first compressed process gas to the second compressor via the further compressor, the further compressor further compressing the first compressed process gas before it is supplied to the second compressor;
the second expander may supply said first expanded process gas to the first expander via the further expander, the further expander further expanding the first expanded process gas before it is supplied to the first expander.

The method may comprise:
one of the first, second and further heat transfer devices transferring heat generated by compression of the process gas in the first compressor to its associated thermal store for storing the heat in the associated thermal store;
one of the first, second and further heat transfer devices transferring heat generated by compression of the process gas in the further compressor to its associated thermal store for storing the heat in the associated thermal store;
one of the first, second and further heat transfer devices transferring heat generated by compression of the process gas in the second compressor to its associated thermal store for storing the heat in the associated thermal store;
one of the first, second and further heat transfer devices transferring heat from its associated thermal store to the second compressed process gas received at the second expander from the compressed gas store;
one of the first, second and further heat transfer devices transferring heat from its associated thermal store to the process gas received at the further expander; and one of the first, second and further heat transfer devices transferring heat from its associated thermal store to the process gas received at the first expander from the further expander.

In the above description of aspects and embodiments of the present invention, where "one of the" is referred to, this could be the first one, the second one or the third one of the items being referred to. As mentioned above, any one or more features described herein in relation to the first aspect of the present invention may be included in the second aspect of the present invention, as appropriate and applicable, and vice versa. Any advantage stated herein for a feature or group of features from the first aspect of the present invention may be applied to the second aspect of the present invention, wherever this same feature or group of features is referred to, and vice versa.

There is also provided a compressed air energy storage (CAES) system which comprises a means for using energy from any source to compress air, a means for storing such compressed air, a plurality of means for capturing in a fluid some or all of the heat created by the compression of the air, a plurality of means for storing the TES fluid, a means for controlling the expansion of the air, and a means for transferring heat from the TES fluid to the air during the expansion process, and a means to convert the compressed air and heat into any form of energy. An optional means of supplementary heating may be provided.

There is also provided a Compressed Air Energy Storage (CAES) system comprising a plurality of stages of compression, expansion and thermal storage, each stage incorporating:
  at least one apparatus that uses energy to compress air or another process gas;
  at least one apparatus that transfers heat from the air or other process gas to a fluid as or after the air or gas is compressed, such fluid being referred to hereafter as a TES (thermal energy system) fluid;
  at least one apparatus to stores the TES fluid that will accommodate its elevated temperature;
  at least one apparatus to recover the heated TES fluid;
  at least one apparatus that transfers heat from the TES fluid to the air or other process gas before, while or after expanding the air or other process gas;
  an apparatus that produces energy from the combination of stored compressed air or other process gas, and heat from the TES fluid.

The heat of compression may be retained within the TES fluid.

At least one of the compressor or compressors may be a rotating compressor. At least one of the compressor or compressors may be powered by electricity. At least one of the compressor or compressors may be powered by one or more of mechanical, kinetic, chemical, fluid or potential energy.

At least one of the expander or expanders may be a rotating turbine. At least one of the expander or expanders may be coupled with apparatus to generate electricity. At least one of the expander or expanders may be coupled with apparatus to produce one or more of mechanical, kinetic, chemical, fluid or potential energy.

The cooling effect of expanding the air or other process gas may be used for other purposes such as but not restricted to air conditioning, refrigeration, cryogenic purposes and distillation.

The heat stored by the TES fluid may be supplemented by heat from another source. The other source of heat may include one or more of a thermal concentrator (including but not limited to a flat or shaped mirror arrangement, or lens arrangement), a heat pump, a solar thermal device, or a combustion process. The supplementary heating may be performed on the TES fluid.

A plurality of stages of compression may be used.

The supplementary heating may be performed on the air or other process gas prior to any or during stage of expansion.

Each stage of compression may be matched with a stage of expansion.

A fluid may transfer heat from any stage of compression, store such heat, then transfer such heat to the corresponding stage of expansion.

Two or more of the stages of compression may be matched with each other.

The TES fluid transferring heat from each of the mutually matched stages of compression may be stored in a common store.

The TES fluid transferring heat to each of the mutually matched stages of expansion may be drawn from a common store.

The TES fluid may be brine. The TES fluid may be water. The TES fluid may be ammonia or any other gas. The TES fluid may be suitable for use in a fuel cell. The TES fluid may be stored in a subterranean cavern. The TES fluid may be stored in a bladder. The TES fluid may be stored in a rock formation. The TES fluid may be stored in a vessel. The TES fluid may be a gas at the elevated temperature and a liquid at the lower temperature. The TES fluid may be maintained at a substantially raised pressure in order to accommodate higher temperatures and/or reduced volumes.

The pressure of the TES fluid may be up to 30 bar. The pressure of the TES fluid may be between 10 bar and 25 bar. The pressure of the TES fluid may be lower than 10 bar, or it may be higher than 30 bar.

The thermal storage may store both hot and cold fluid, with stratification of different temperature fluid, and/or a thermocline, and/or a float, and/or piston that separates the hotter fluid from the cooler fluid.

The compression ratio of at least one of the compressors may be selected to generate heat at a rate at which the thermal fluid may store in the selected pressure range.

The number of stages of compression and/or expansion may be selected to yield the selected rate of heat generation.

There may be between three and five stages of compression, and between three and five stages of expansion.

Each stage of compression may have a similar compression ratio to the expansion ratio of a corresponding stage of expansion.

The number of stages of compression may equal the number of stages of expansion.

A plurality of the stages of compression may have similar compression ratios to each other, and an equal plurality of the stages of compression may have similar expansion ratios to each other.

Each matched stage of compression and expansion may have a thermal management subsystem, such thermal subsystem incorporating at least a hot thermal store, a thermal fluid, a means of transferring heat from the air or other process gas into the thermal fluid during compression, and a means of transferring heat from the thermal fluid to the air or other process gas during expansion.

The compression ratios of a plurality of stages of compression are matched with each other.

The expansion ratios of a plurality of stages of expansion are matched with each other.

A plurality of matched compression stages may share a thermal management subsystem with a similar plurality of expansion stages, such thermal subsystem incorporating at least a hot thermal store, a thermal fluid, a means of transferring heat from the air or process gas into the thermal fluid during compression, and a means of transferring heat from the thermal fluid to the air or other process gas during expansion.

There may be between three and five stages of compression and an equal number of stages of expansion.

The air or other process gas may be air. The air or other process gas may be methane.

The system may be fitted to a mobile device.

The energy of any kind (such as but not restricted to electric, mechanical, chemical and fluid) may be converted into compressed air energy.

The compressed air and heat energy may be converted from energy of any kind (such as but not restricted to electric, mechanical, chemical, potential and fluid).

The compressed air and heat energy may be converted into energy of any kind such as but not restricted to electric, mechanical, chemical, potential and fluid.

The temperature and pressure of the hot reservoir may be suitable for keeping a liquid in its liquid state, as a superheated liquid.

The temperature of the hot reservoir may be no higher than 500° C. The temperature of the hot reservoir may be no higher than 350° C. The temperature of the hot reservoir may be no higher than 250° C.

One compressor or set of compressors may be operated at pressures wholly or partially below the normal operating pressure range of the system, and wholly or partially different compressor or set of compressors may be operated at pressures incorporating the operating pressure range of the system.

The lower pressure compressor or set of compressors may be de-coupled from the higher pressure compressor or set of compressors.

The lower pressure compressor or set of compressors may be removed from the system, and the system is operated with only the higher pressure compressor or set of compressors.

The heating provided from thermal storage may be supplemented by heating provided by any other means.

Some of the heat generated may be used for other purposes, such as in another process or application.

The cooling provided by the thermal fluid may be supplemented by cooling provided by any other means.

Some of the cold generated may be used for other purposes, such as in another process or application.

There is provided a Compressed Air Energy Storage (CAES) method consisting of a plurality of stages of compression, expansion and thermal storage, each stage incorporating:
  at least one means of using energy to compress air or another process gas;
  at least one means of transferring heat from the air or other process gas to a fluid as or after the air or gas is compressed, such fluid being referred to hereafter as a TES (thermal energy method) fluid;
  at least one means of storing the TES fluid that will accommodate its elevated temperature;
  at least one means of recovering the heated TES fluid;
  at least one means of transferring heat from the TES fluid to the air or other process gas before, while or after expanding the air or other process gas;
  and means of producing energy from the combination of stored compressed air or other process gas, and heat from the TES fluid.

The heat of compression may be retained within the TES fluid.

The at least one of the means of compression may be a rotating compressor. The at least one of the means of compression may be powered by electricity. The at least one of the means of compression may be powered by one or more of mechanical, kinetic, chemical, fluid or potential energy.

The at least one of the means of expansion may be a rotating turbine. The at least one of the means of expansion may be coupled with apparatus to generate electricity. The at least one of the means of expansion may be coupled with one or more means to produce one or more of mechanical, kinetic, chemical, fluid or potential energy.

The cooling effect of expanding the air or other process gas may be used for other purposes such as but not restricted to air conditioning, refrigeration, cryogenic purposes and distillation.

The heat stored by the TES fluid may be supplemented by heat from another source.

The other source of heat may include one or more of a thermal concentrator (including but not limited to a flat or shaped mirror arrangement, or lens arrangement), a heat pump, a solar thermal device, or a combustion process.

The supplementary heating may be performed on the TES fluid.

A plurality of stages of compression may be used.

The supplementary heating may be performed on the air or other process gas prior to or during any stage of expansion.

Each stage of compression may be matched with a stage of expansion.

A fluid may transfer heat from any stage of compression, store such heat, then transfer such heat to the corresponding stage of expansion.

Two or more of the stages of compression may be matched with each other.

The TES fluid transferring heat from each of the mutually matched stages of compression may be stored in a common store.

The TES fluid transferring heat to each of the mutually matched stages of expansion may be drawn from a common store.

The TES fluid may be brine. The TES fluid may be water. The TES fluid may be ammonia or any other gas. The TES fluid may be suitable for use in a fuel cell. The TES fluid may be stored in a subterranean cavern. The TES fluid may be stored in a bladder. The TES fluid may be stored in a rock formation. The TES fluid may be stored in a vessel. The TES fluid may be a gas at the elevated temperature and a liquid at the lower temperature. The TES fluid is maintained at a substantially raised pressure in order to accommodate higher temperatures and/or reduced volumes.

The pressure of the TES fluid may be up to 30 bar. The pressure of the TES fluid may be between 10 bar and 25 bar. The pressure of the TES fluid may be lower than 10 bar, or it may be higher than 30 bar.

The thermal storage may store both hot and cold fluid, with stratification of different temperature fluid, and/or a thermocline, and/or a float, and/or piston that separates the hotter fluid from the cooler fluid.

The compression ratio of at least one of the compressors may be selected to generate heat at a rate at which the thermal fluid may store in the selected pressure range.

The number of stages of compression and/or expansion may be selected to yield the selected rate of heat generation.

There may be between three and five stages of compression, and between three and five stages of expansion.

Each stage of compression may have a similar compression ratio to the expansion ratio of a corresponding stage of expansion.

The number of stages of compression may equal the number of stages of expansion.

A plurality of the stages of compression may have similar compression ratios to each other, and an equal plurality of the stages of compression may have similar expansion ratios to each other.

Each matched stage of compression and expansion may have a thermal management means, such thermal means incorporating at least a hot thermal store, a thermal fluid, a means of transferring heat from the air or other process gas into the thermal fluid during compression, and a means of transferring heat from the thermal fluid to the air or other process gas during expansion.

The compression ratios of a plurality of stages of compression may be matched with each other.

The expansion ratios of a plurality of stages of expansion may be matched with each other.

The plurality of matched compression stages may share a thermal management means with a similar plurality of expansion stages, such thermal means incorporating at least a hot thermal store, a thermal fluid, a means of transferring heat from the air or process gas into the thermal fluid during compression, and a means of transferring heat from the thermal fluid to the air or other process gas during expansion.

There may be between three and five stages of compression and an equal number of stages of expansion.

The air or other process gas may be air. The air or other process gas may be methane.

The method may incorporate a mobile device.

Energy of any kind (such as but not restricted to electric, mechanical, chemical and fluid) may be converted into compressed air energy.

The compressed air and heat energy may be converted from energy of any kind (such as but not restricted to electric, mechanical, chemical, potential and fluid).

The compressed air and heat energy may be converted into energy of any kind such as but not restricted to electric, mechanical, chemical, potential and fluid.

The temperature and pressure of the hot reservoir may be suitable for keeping a liquid in its liquid state, as a superheated liquid.

The temperature of the hot reservoir may be no higher than 500° C. The temperature of the hot reservoir may be no higher than 350° C. The temperature of the hot reservoir may be no higher than 250° C.

One compressor or set of compressors may be operated at pressures wholly or partially below the normal operating pressure range of the method, and wholly or partially different compressor or set of compressors may be operated at pressures incorporating the operating pressure range of the method.

The lower pressure compressor or set of compressors may be de-coupled from the higher pressure compressor or set of compressors.

The lower pressure compressor or set of compressors may be removed from the method, and the method is operated with only the higher pressure compressor or set of compressors.

The heating provided from thermal storage may be supplemented by heating provided by any other means.

Some of the heat generated may be used for other purposes, such as in another process or application.

The cooling provided by the thermal fluid may be supplemented by cooling provided by any other means.

The cold generated may be used for other purposes, such as in another process or application.

Throughout this patent application,

"Air" may mean natural air or any other gas or mixture of gases that may be compressed. Such gases are referred to as "air" because the most common embodiments are expected to use air.

"Fluid" may mean any suitable liquid or gas, or mixture of liquids or mixture of gases.

"Hot" is used to denote any temperature higher than the temperature denoted by "cold".

"Heat of compression" is the heat expelled by the air as a result of compressing it.

"Cold of expansion" is the heat required to be absorbed by the air as a result of expanding it.

"TES fluid" or "thermal energy fluid" may be used to refer to the same, which may be the fluid in which the heat of compressions is transferred and/or stored for re-use in relation to expansion (prior to, during and/or after expansion).

Energy is transformed from any type (for example, electric, mechanical or chemical) into compressed air using a means of compression. This compression will generate heat, both in the compressor due to the work being done, and in the air due to its state of compression. Any means of compression may be used.

The compressors may be one or more of turbine, screw, scroll or reciprocating expanders, or any other type of compressor.

Some or all such heat is transferred to a fluid by any heat exchange process. Any means of heat exchange may be used. Such heat exchange process may be in a heat exchanger following any stage of compression of individual compressors, and/or in an intercooler between stages of compression of multi-stage compressors.

The TES fluid is stored in its hot and cold states, thereby forming a closed-loop system. Alternatively an open-loop system may be used wherein the TES fluid is stored hot and discharged when cold; in which case cold fluid is obtained from elsewhere prior to or during compression. Any means of storage may be used, though better embodiments will normally minimise the heat lost by the TES fluid during storage and transfer.

In order to optimise the round-trip (i.e. energy out divided by energy in) efficiency of adiabatic CAES, and/or to optimise the capital investment required, the TES fluid may be stored and transported at an elevated pressure. If the TES fluid is a liquid, this would increase its boiling point. If the TES fluid is a gas, this would reduce the volumetric requirements of the system.

When the compressed air is expanded to generate some other form of energy (for example, electricity or mechanical energy), it requires heat input. The hot fluid is then drawn out of its storage and heat is transferred back into the air. This may be at any part of the process of expansion, generation and exhaust.

Energy is transformed to any type (for example, electric, mechanical or chemical) into compressed air using a means of expansion. This expansion will absorb heat, both in the expander due to the work being done, and in the air due to its state of expansion. Any means of expansion may be used.

The expanders may be one or more of turbine, screw, scroll or reciprocating expanders, or any other type of expander.

The expansion ratio of each expander is selected to require a heat input that will raise the temperature of the air to a temperature suitable for expansion, given the temperature of the TES fluid that supplies heat to such expander.

As there are thermal inefficiencies in heat transfer and storage, there may optionally be a supplementary heating arrangement associated with each expander. Such supplementary heating arrangement may heat the air prior to or during expansion, or may heat the TES fluid either in storage or prior to heat transfer. Examples of such supplementary heating arrangements include fuel combustors, electric heating elements, solar thermal or concentrated solar thermal heating, transfer of heat from another process or system, or any other supplementary heating arrangement.

The exhaust from the generation process may pass into a vessel for later re-use, in which case the heat could be applied to the vessel containing the exhaust gas or air.

There is a plurality of heat storage arrangements. Any type of heat store may be used. Each heat storage arrangement takes heat from one or more intercoolers or heat exchangers during the compression or charging cycle, and supplies heat to one or more interheaters or heat exchangers during the expansion or discharging cycle. The compression ratios of the compressors or compression stages are substantially matched with those of the expanders or expansion stages that are attached to the same heat storage arrangement.

DETAILED DESCRIPTION

Figure 1:
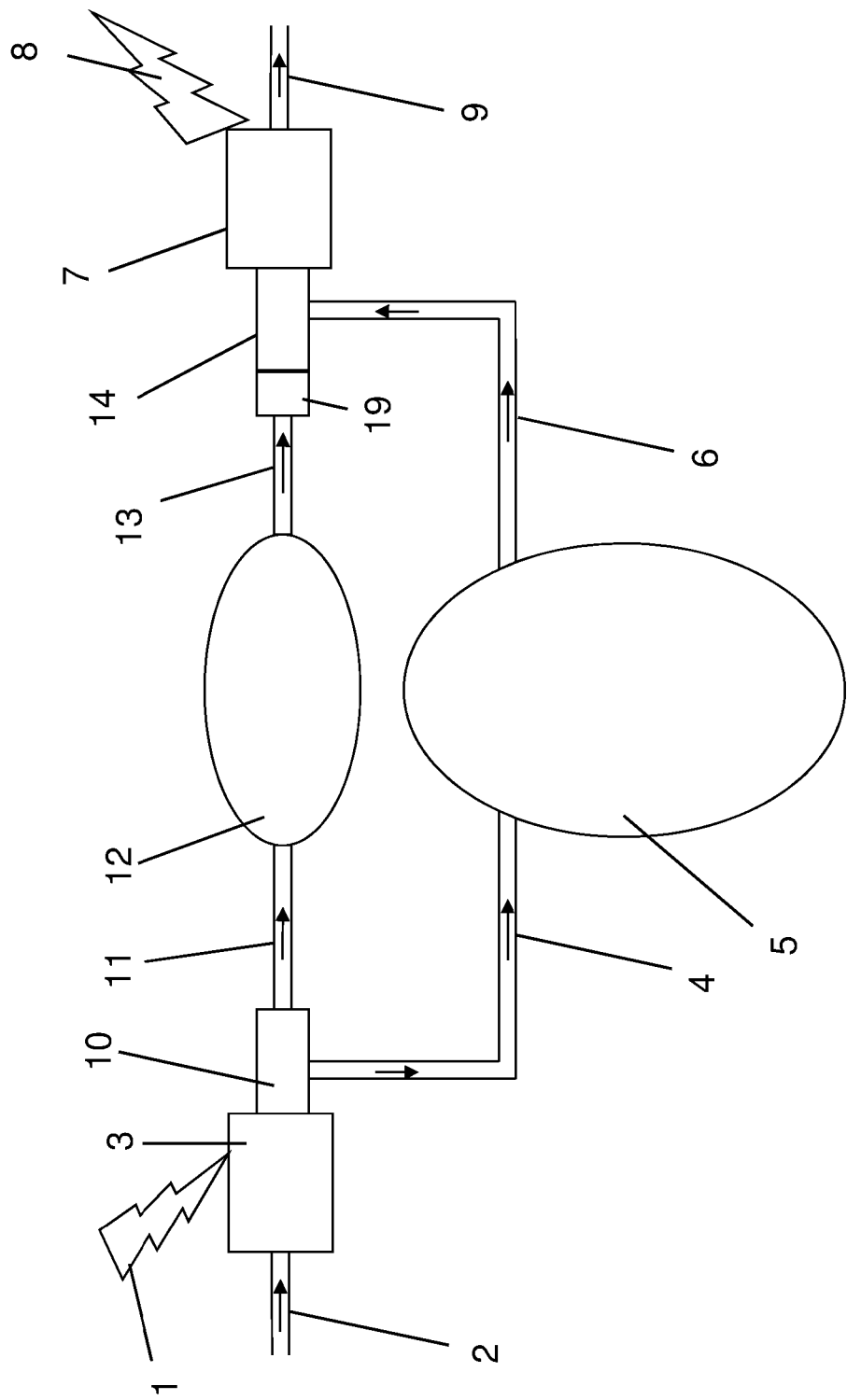
FIG. 1 shows a schematic diagram of a basic system, showing the direction of flow of both air and fluid, in an example wherein the cold thermal energy fluid is stored in the same storage as the hot, with no supplementary cooling; supplementary heating is shown. For clarity, the return loop of the cold thermal fluid is not shown; this diagramme could therefore represent either a closed-loop thermal subsystem (with such return loop and cold storage shown as in FIG. 2, or with thermal energy fluid flows being depicted as reversible in direction) or an open-loop thermal subsystem with thermal energy fluid entering the system at 10 and exiting it at 14.

Embodiments of the invention will be described in the following, by way of example only, and with reference to the drawings mentioned above.

In the following, like features will be given the same reference numerals. Arrows shown in the figures may represent a fluid flow. Where air is referred to in the following, it will be appreciated that this could of course be any other appropriate process gas.

Referring to FIG. 1, there is an energy storage system in which energy 1 and air 2 is fed in, the air is compressed 3 using the energy, then piped or transported 4 into a storage means for the compressed air 5, from which it can then be piped or transported 6 into an expansion means 7 where it incorporates or is coupled with a means that generates energy of another form 8 (that is, other than compressed air), following which the air is expelled 9 from the expansion means.

Heat is transferred by a heat transfer means 10 such as (but not limited to) a heat exchanger into the TES fluid from the compression means, then piped or transported 11 into a hot fluid storage means 12. Such coupling includes coupling with the hot compressed air, or coupling with the cold uncompressed air in order to cool it prior to compression, or coupling with the air at any intermediate stage. Such heating of the TES fluid by the means of compression may be performed either directly or indirectly.

The hot fluid is then piped or transported 13 to the means whereby heat is transferred 14 to the expansion means. The expelled air may optionally be fed back into the compression means in a closed loop or similar system.

An optional supplementary heating arrangement 19 is depicted in a location suited to heating the hot TES fluid prior to entering the heat exchanger, to provide supplementary heating to the air entering the expansion means 70.

In other words, referring to FIG. 1, there is shown an energy storage apparatus comprising at least one inlet 2 for incoming air and at least one outlet 9 for expanded air. The at least one inlet 2 and at least one outlet 9 connects to a single compressor and expander arrangement, which is in fluid communication with a compressed gas store 5.

The compressor and expander arrangement comprises a compressor 3, an expander 7, a first thermal store 12 and first 10 and second 14 heat transfer devices. The arrangement also comprises various conduits for providing heat transfer communication between the various parts.

While the apparatus of FIG. 1 is described using fluid for transferring and storing heat, and so fluid conduits are described, it will be appreciated that it is not necessary to use a fluid for transferring and storing heat, and any other suitable means for transferring and storing heat may be employed as required or desired. For example, heat may be transferred via solid conduits using conduction.

The compressor 3 is configured to receive energy 1 from an external source and to use this energy to compress the incoming air. As such, the compressor 3 may be said to form part of an input transducer, which converts said input energy 1 to potential energy in the form of compressed air produced by the compressor 3. At least a first fluid conduit 4 connects the compressor 3 and the compressed air store 5.

The expander 7 is configured to expand compressed air received from the compressed air store 5 and generate energy 8 from said expansion. As such, the expander 7 may be said to form part of an output transducer, which converts potential energy of the compressed gas another form of energy 8 produced by the expander 7. At least a second fluid conduit 6 connects the compressed gas store 5 and the expander 7.

A first heat transfer device 10, such as a heat exchanger, allows heat, generated in the compression of the incoming air, to be transferred from the compressor 3 to the thermal energy fluid in at least a third fluid conduit 11. The third fluid conduit 11 provides fluid communication between the first heat transfer device 10 and the first thermal store 12.

The energy storage apparatus comprises a second heat transfer device 14, such as a heat exchanger. At least a fourth fluid conduit 13 provides for fluid communication between the thermal store 12 and the second heat transfer device 14. The third fluid conduit 11, thermal store 12 and fourth fluid conduit 13 may comprise a thermal energy fluid that is selected based on the particular structure and requirements of the energy storage apparatus and various parts thereof. The fourth fluid conduit 13 and second heat transfer device 14 allow heat stored in the thermal energy fluid in the thermal store 12 to be transferred to compressed air received in the expander 7 from the compressed gas store 5.

In some examples, the arrangement further comprises a heating arrangement 19 configured to supply supplementary heat to the fluid and/or to the air at or before the expander 7 (in this Figure it is depicted heating the fluid), and/or at the at least one thermal store 12 for heating the compressed air received at the expander 7 from the compressed gas store 5.

There may of course be various pumps, valves, instruments, gauges and/or other devices, present at various points in the energy storage apparatus (e.g. in the flow path of the air processed by the system and/or in the flow path of the thermal energy fluid) to ensure smooth, safe and controllable operation of the apparatus, but for simplicity these are not described or illustrated in any detail. There may also be a control system for the apparatus.

In use, air is fed into the energy storage apparatus via the inlet 2, specifically to the compressor 3. The compressor 3 compresses the incoming air using the energy 1 received at the compressor from the external energy source. The compressed air flows along the first fluid conduit 4 to the compressed gas store 5 where it is stored.

Heat is generated as the air is compressed, this heat being transferred to the thermal energy fluid in the third fluid conduit 11 via the first heat transfer device 10. The heated thermal energy fluid flows into the first thermal energy store 12 where it is stored for re-use by the expander 7, providing for a more energy efficient apparatus.

When compressed air is to be expanded (in order to convert energy in the compressed air into another desired form of energy), the expander 7 receives compressed air from the compressed gas store 5 via the second fluid conduit 6. The heated thermal energy fluid flows from the first thermal store 12 to the second heat transfer device 14 via the fourth fluid conduit 13. At the second heat transfer device 14, heat is transferred from the heated thermal energy fluid to the compressed air received in the expander 7. In this way, the compressed air is heated prior to, and/or during, expansion to increase the efficiency of conversion of the potential energy of the compressed gas to the other desired form of energy by the expander 7. The expander 7 is used to expand the compressed air. This expanded air leaves the expander 7, and the compressor and expander arrangement, via the outlet 9. In some embodiments, the expanded air can re-enter the energy storage apparatus at the inlet 2 in a closed loop system.

Figure 2:
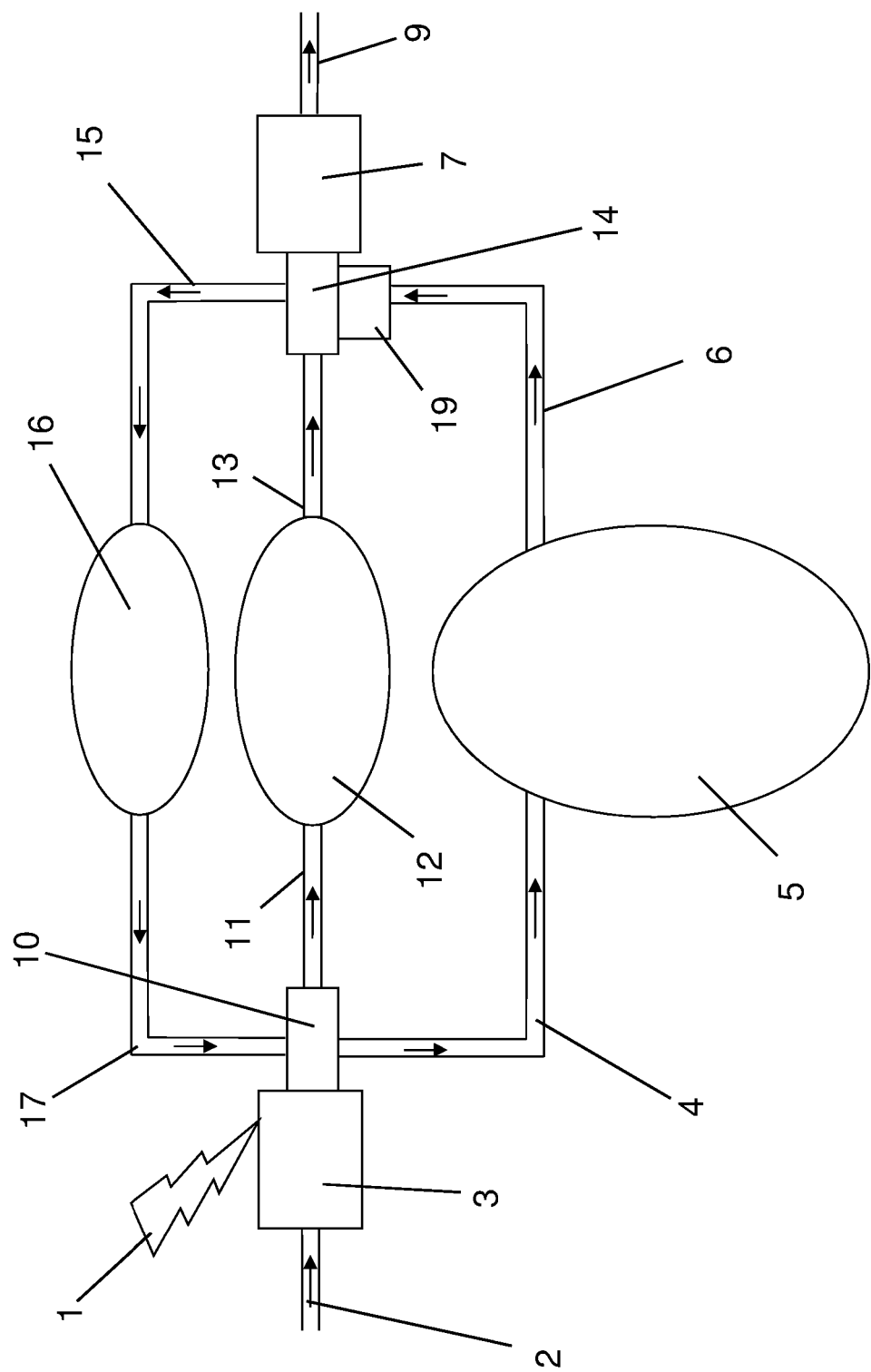
FIG. 2 shows a schematic diagram of the system of FIG. 1, with a feedback loop of the TES fluid that incorporates cold storage such that the hot and cold fluid are stored separately, showing the direction of flow of both air and fluid.

Referring to FIG. 2, this shows a similar energy storage system to that shown in FIG. 1, in which the cold fluid is piped or transported 15 from the means whereby heat is transferred to the expansion means (second heat transfer device 14). It is then stored in its cold state 16 then piped or transported 17 to the means whereby heat is transferred from the compression means (first heat transfer device 10). This forms a closed loop or similar system for the TES fluid.

The TES fluid is used to store the heat generated from compression of air, such as (but not restricted to) the compressed air used to store electrical energy. In this case the TES fluid could be stored in one or more manufactured thermal stores and/or additional caverns underground.

An optional supplementary heating arrangement 19 is depicted in a location suited to heating the cold air prior to entering the heat exchanger (whereas it could alternatively or also be located to provide supplementary heating to the warm fluid, as depicted in FIG. 1), to provide supplementary heating to the air entering the expansion means 7.

The hot fluid would be stored in a storage means coupled with the means of compression such that the means of compression heats the TES fluid prior to storage.

Such heating of the TES fluid by the means of compression may be performed either directly or indirectly. Any suitable storage means may be used.

The TES fluid would also be coupled after storage to the means of expansion such that the means of expansion cools the TES fluid. Such cooling of the TES fluid by the means of expansion may be performed either directly or indirectly. Such coupling includes coupling with the hot compressed air, or coupling with the cold uncompressed air in order to cool it prior to compression, or coupling with the air at any intermediate stage.

In other words, referring to FIG. 2, there is an energy storage apparatus that is similar to the energy storage apparatus shown in FIG. 1. The energy storage apparatus of FIG. 2 comprises all of the features of the energy storage apparatus shown in FIG. 1.

The energy storage apparatus of FIG. 2 shows the compressor and expander arrangement further comprising a second thermal store 16, a fifth fluid conduit 15 and a sixth fluid conduit 17. The first 10 and second 14 heat transfer devices are connected to the second thermal store 16 via a sixth fluid conduit 17 and a fifth fluid conduit 15 respectively. Each of the second thermal store 16, fifth fluid conduit 15 and sixth fluid conduit 16 hold a thermal energy fluid that can be the same as, or different to, the thermal energy fluid held in the first thermal store 12, the third fluid conduit 11 and the fourth fluid conduit 13.

The fifth fluid conduit 15 is arranged to transfer the thermal energy fluid between the second heat transfer device 14 and the second thermal store 16, and the sixth fluid conduit 17 is arranged to transfer the thermal energy fluid between the second thermal store 16 and the first heat transfer device 10. As mentioned in relation to FIG. 1, the expander 7 uses heat from the thermal energy fluid received from the first thermal store 12 to initially heat the compressed air, reducing the amount of external energy required to then expand the air (and/or increasing the efficiency with which the expander 7 converts the energy of the compressed air to the desired output energy). The use of the heat from the thermal energy fluid results in a cooled thermal energy fluid that is transported by the fifth fluid conduit 15 to the second thermal store 16. The cooled thermal energy fluid is stored in the second thermal store 16 ready to be recirculated back to the first heat transfer device 10 via the sixth fluid conduit 17. At the first heat transfer device 10 the thermal energy fluid will be heated again when the compressor 3 compresses incoming air. As such, the sixth 17 and third 11 fluid conduits are in fluid communication via the first heat transfer device 10, and the fourth 13 and fifth 15 fluid conduits are in fluid communication via the second heat transfer device 14. As such, the thermal energy fluid may flow through the third fluid conduit to the first thermal store 12, through the fourth fluid conduit 13 to the second heat transfer device 14, through the fifth fluid conduit 15 to the second thermal store 16, through the sixth fluid conduit 17 to the first heat transfer device 10 and back to the third fluid conduit 11, in a repeated cycle.

In use, further to that described in relation to FIG. 1, since the heat stored in the thermal energy fluid is absorbed by the compressed air at the expander 7, the thermal energy fluid at the second heat transfer device 10 is cooled. This cooled thermal energy fluid flows along the fifth fluid conduit 15 to the second thermal store 16, where the cooled thermal energy fluid is stored. When incoming air is to be compressed, the cooled thermal energy fluid flows along the sixth fluid conduit 17 to the first heat transfer device 10. Heat generated during compression is then transferred to the thermal energy fluid at the first heat transfer device 10. Use of the cooled thermal energy fluid creates a greater temperature differential at the first heat transfer device 10 so that more heat energy is transferred to the cooled thermal energy fluid during compression. This cycle of compressing and expanding the air will be repeated and so heating of the thermal energy fluid at the first heat transfer device and cooling of the thermal energy fluid at the second heat transfer device will also be a repeating cycle.

Figure 3:
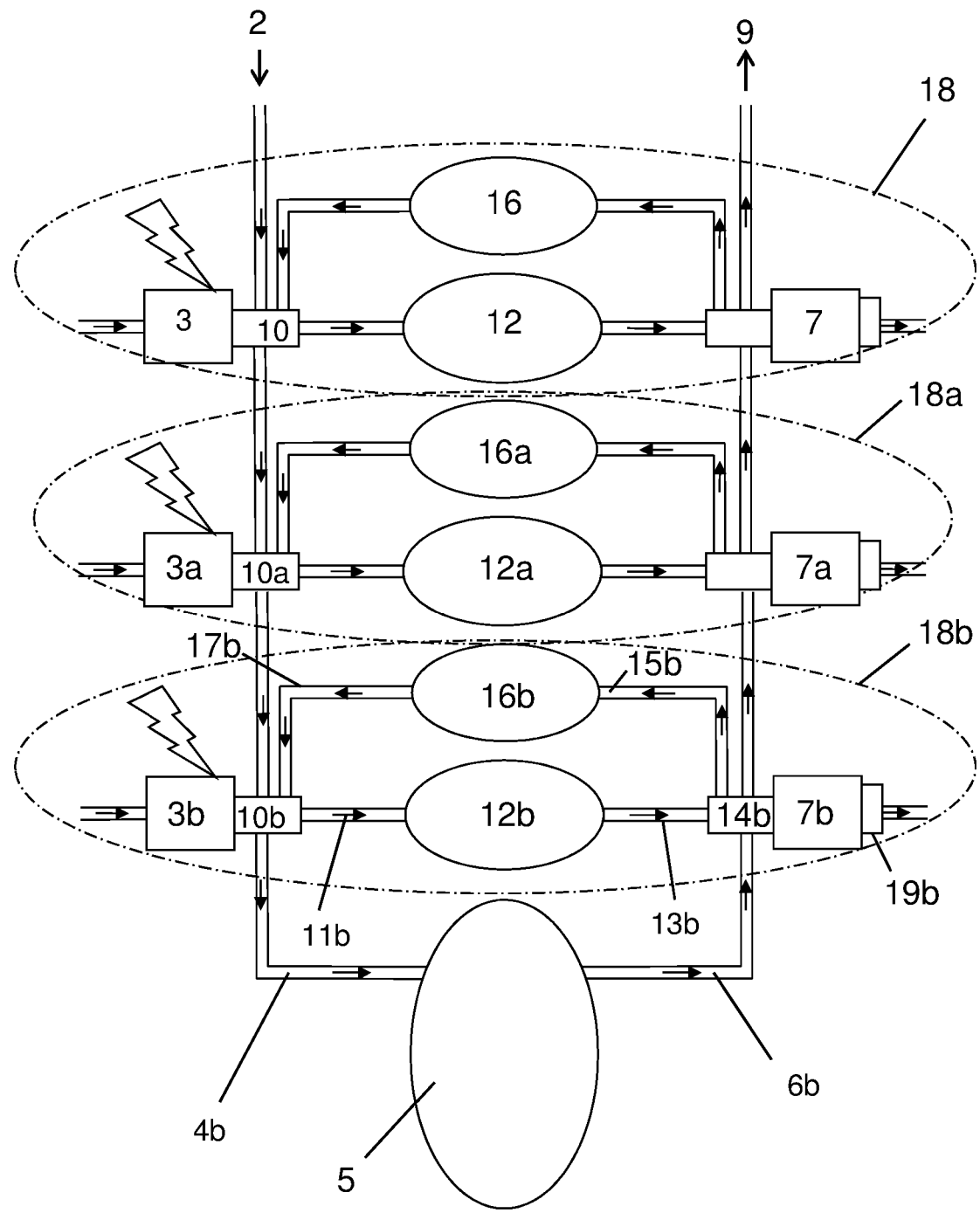
FIG. 3 shows a schematic diagram of an embodiment of an energy storage apparatus with three stages of each of compression and expansion as depicted in FIG. 1 (but without supplementary heating), with the compressor and expander of each stage paired with each other, and a fluid transfer and storage circuit for each stage (other numbers of stages (or sub-systems) are possible, as will become clear from the description); it also depicts each compressor and each expander as a separate item of equipment whereas (as is clear from the description) the compressors may share a shaft; the expanders may share a shaft; all may share a single shaft; and other configurations are possible.

Referring to FIG. 3, there is shown an energy storage system as depicted in FIG. 2, with a multiplicity of compression stages matched with the same multiplicity of expansion stages. In this figure, for purposes of clarity, three stages of compression are each matched with three stages of expansion; other numbers of stages are possible, and each stage may comprise one or more of either or both of compressors or expanders. Also for clarity, the pairing of compressors with expanders is shown as the most obvious pairing, i.e. the first-stage compressor with the third-stage expander, the second stage of each, and the third-stage compressor with the first-stage expander; other pairings are possible. The heat exchangers 10, 14 and related pipework 11, 13, 15, 17 are depicted slightly differently from their depictions in FIGS. 1 and 2, for reasons of graphical clarity. The second stage of compression/expansion/TES is depicted by the dot-and-dashed line 18. an arrangement may be used to optimise thermal transfer between the compression and expansion stages by matching the amount of heat output from the compression stage with the amount of heat required by the expansion stage.

In other words, FIG. 3 shows an embodiment of an energy storage apparatus. The energy storage apparatus comprises three energy storage sub-systems (each one of the sub-systems highlighted by one of the dotted lines 18, 18*a*, 18*b*) arranged in series with each other and with a compressed gas store 5 (i.e. such that, in use, process gas passes from the first sub-system 18 to the second sub-system 18*a* to the third sub-system 18*b* and to the compressed gas store 5 when the process gas is being compressed; and such that, in use, process gas passes from the compressed gas store 5 to the third sub-system 18*b* to the second sub-system 18*a* to the first sub-system 18 when the process gas is being expanded).

While FIG. 3 shows three energy storage sub-systems, it will be appreciated that any number (greater than or equal to two) of these arrangements may be employed as required or desired for the apparatus. For clarity, not all of the features in each of the arrangements have been labelled, but it will be apparent from the discussion herein which features are present.

The energy storage apparatus comprises an inlet 2 for incoming process gas and an outlet 9 for expanded process gas. For the embodiment described in FIG. 3, the process gas is described as air, although it will be appreciated that any other suitable process gas can be used as required or desired.

Each of the energy storage sub-systems 18, 18*a*, 18*b* comprises at least a compressor 3, 3*a*, 3*b*, an expander 7, 7*a*, 7*b* a first thermal store 12, 12*a*, 12*b* and first 10, 10*a*, 10*b* and second 14, 14*a*, 14*b* heat transfer devices. In other embodiments, the first 10, 10*a*, 10*b* and second 14, 14*a*, 14*b* heat transfer devices may each be a single, dual purpose heat transfer device. FIG. 3 also shows each of the energy storage sub-systems 18, 18*a*, 18*b* further comprising a second thermal store 16, 16*a*, 16*b*, although in some embodiments, the second thermal store 16, 16*a*, 16*b* may not be present, and in other embodiments the hot and cold fluid may be stored in different parts of a single thermal store in each stage, as depicted most clearly in FIG. 4. Where both first and second thermal stores are present, the first thermal store 12, 12*a*, 12*b* may act as a hot store and the second thermal store 16, 16*a*, 16*b* may act as a cold store.

Each of the energy storage sub-systems 18, 18*a*, 18*b* also comprises various conduits for providing heat transfer communication between the various parts. While the embodiment of FIG. 3 is described using fluid for transferring and storing heat, and so fluid conduits are described, it will be appreciated that it is not necessary to use a fluid for transferring and storing heat, and any other suitable means for transferring and storing heat may be employed as required or desired. For example, in one embodiment, the heat transfer fluid may be used within the thermal store to store heat; whereas in other embodiments a different medium may be used in the thermal store to store heat such that the heat transfer fluid and hat storage medium in the heat store are different.

Since each of the arrangements 18, 18*a*, 18*b* in this embodiment are generally equivalent, only one of the arrangements 18, 18*a*, 18*b* will be described in detail.

Each of the compressors 3, 3*a*, 3*b* is configured to receive energy from an external source and to use this energy to compress the incoming air. Each of the expanders 7, 7*a*, 7*b* is configured to receive compressed air from the compressed gas store and expand the air received to create a different type of desired output energy.

The first compressor 3 is configured to provide a first compression to incoming air received from the at least one inlet 2 and to supply the first compressed process gas to the second compressor 3*a*.

The second compressor 3*a* is configured to provide a second compression to incoming first compressed air received from the first compressor 3 via conduit 4 and to supply the second compressed air to the third compressor 3*b*.

The third compressor 3*b* is configured to provide a third compression to incoming second compressed air received from the second compressor 3*a* via conduit 4*b* and to supply the third compressed air to the compressed gas store 5.

The third expander 7*b* is configured to provide a first expansion to the third compressed air received from the compressed gas store 5 via conduit 9 and to supply the first expanded air to the second expander 7*a*.

The second expander 7a is configured to provide a second expansion to the first expanded air received from the third expander 7b via conduit 9 and to supply the second expanded air to the first expander 7.

The first expander 7 is configured to provide a third expansion to the second expanded process gas received from the second compressor 7a via conduit 9 and to supply the third expanded air to the at least one outlet 9.

A first heat transfer device 10, 10a, 10b, such as a heat exchanger, is arranged at the compressor 3, 3a, 3b to allow heat, generated in the compression of the incoming air, to be transferred from the compressor 3a, 3b, 3c to the thermal energy fluid in a fluid conduit 11, 11a, 11b. The fluid conduit 11, 11a, 11b provides fluid communication between the heat transfer device 10, 10a, 10b and the hot store 12, 12a, 12b. Therefore, the heat generated in the compression of the incoming air is transferred to the hot store 12, 12a, 12b via the heat transfer device 10, 10a, 10b and the fluid conduit 11, 11a, 11 b.

A second heat transfer device 14, 14a, 14b, such as a heat exchanger, is arranged at the expander 7, 7a, 7b to allow heat stored in the thermal energy fluid in the hot store 12, 12a, 12b to be transferred to incoming air received in the expander 7, 7a, 7b via a fluid conduit 13, 13a, 13b. The fluid conduit 13, 13a, 13b provides fluid communication between the hot store 12, 12a, 12b and the heat transfer device 10, 10a, 10b. Therefore, the heat generated in the compression of the incoming air and stored in the hot store 12, 12a, 12b is transferred to the expander 7, 7a, 7b via the heat transfer device 14, 14a, 14b and the fluid conduit 13, 13a, 13b.

Optionally the two heat transfer devices 11 and 14 (and similarly 11a and 14a, 11b and 14b) may actually comprise a single heat transfer device being operated in a different mode during expansion from the mode during compression. To do so would require a configuration of conduits, valves etc. to guide the thermal fluid appropriately for each operating mode.

Optionally, in some embodiments, each of the energy storage sub-systems 18, 18a, 18b may further comprise a heating arrangement 19, 19a, 19b (not shown, for reasons of clarity) configured to supply heat at the expander 7, 7a, 7b, for heating the incoming air received at the expander 7, 7a, 7b; and/or a heating arrangement configured to supply heat at the at least one thermal store 12, 12a, 12b, for heating the thermal storage fluid in the thermal store.

Since the expander uses the heat from the thermal energy fluid at the expander, the resulting thermal energy fluid has a reduced heat and may therefore be referred to as cold. This cold is transferred to the cold store 16, 16a, 16b via the fluid conduit 15, 15a, 15b.

The first heat transfer device 10, 10a, 10b also allows cold stored in the cold store 16, 16a, 16b (or the cold part of a combined store; similarly where a cold store is mentioned elsewhere, and so also for hot stores) to be transferred to incoming air received at the compressor 10, 10a, 10b before and/or during compression.

Optionally, in some embodiments, each of the energy storage sub-systems 18, 18a, 18b may further comprise a cooling arrangement (not shown) configured to supply cold to (or remove heat from) air received at the compressor 3a, 3b, 3c to at least help overcome thermodynamic losses in the apparatus due to inherent inefficiencies.

In use, incoming air flows into the energy storage apparatus via the inlet 2. The incoming air is passed to the first compressor 3, which may be set with any suitable and desired compression ratio. The compression ratio is related to the amount of heat that will generated by the compressor and is selected to optimise the heat generated, to optimise the temperature of the hot store 12. In some embodiments, the compression ratio of compressor 3 is matched with an expansion value of expander 7. This is because the expansion ratio is related to the amount of heat that is lost be the expander when it is operating. It is advantageous in some embodiments if, whilst the expander and compressor in a particular sub system are in use, the amount of heat generated by the compressor is (before allowing for losses in the system) similar to the amount of heat lost by the expander.

In other embodiments, pipework, valves etc. are arranged such that compressor 3 of the first subsystem is in heat transfer communication with hot store 12b of the third subsystem, and so in this case for instance the compression value of compressor 3 may be matched with the expansion value of expander 7b which is in heat transfer communication hot store 12b. It will be appreciated that in other embodiments pipework, valves, conduits etc. may be arranged such that the compressor of any subsystem is in heat transfer communication with the hot store of any subsystem, and the hot store of any subsystem is in heat transfer communication with the expander of any subsystem.

Cold from the cold store 16 is passed to the incoming air at the first compressor 3 prior to and/or during compression from the thermal energy fluid in the conduit 17 via the heat transfer device 10. Heat generated during the first compression in the first compressor 3 is passed to the thermal energy fluid in conduit 11 via the first heat transfer device 10, which is passed to the hot store 12 for storage. At any or each stage, the cold fluid from the cold store may undergo supplementary cooling before use in cooling the newly compressed air; alternatively or additionally it may undergo that supplementary cooling prior to entering the cold store. (Likewise, the hot fluid may undergo supplementary heating before and/or after the hot store).

The first compressed air is then passed from the first compressor 3 to the second compressor 3a via the conduit 4. Cold from the cold store 16a is passed to the first compressed air at the second compressor 3a prior to and/or during compression from the thermal energy fluid in the conduit 17a via the heat transfer device 10a.

The first compressed air undergoes a second compression in the second compressor 3a. Again, the compression ratio is selected to optimise the heat generated, to optimise the temperature of the hot store 12a. Heat generated during the second compression in the second compressor 3a is passed to the thermal energy fluid in conduit 11a via the second heat transfer device 10a, which is passed to the hot store 12a for storage.

The second compressed air is then passed from the second compressor 3a to the third compressor 3b via the conduit 4a. Cold from the cold store 16b is passed to the second compressed air at the third compressor 3b prior to and/or during compression from the thermal energy fluid in the conduit 17b via the heat transfer device 10b.

The second compressed air undergoes a third compression in the third compressor 3b. Again, the compression value is selected to optimise the heat generated, to optimise the temperature of the hot store 12b. Heat generated during the third compression in the third compressor 3b is passed to the thermal energy fluid in conduit 11b via the first heat transfer device 10b, which is passed to the hot store 12b for storage.

The third compressed air passes to the compressed gas store 5. The compressed gas store may for instance be an underground cavern.

When desired, the third compressed air is passed from the compressed gas store 5 to the third expander 7b via the fluid conduit 6b. The expansion ratio of the third expander 7b is selected to match the compression ratio of the compressor with which it shares a heat store. As mentioned above, this could be the compressor 3b as in the pictured embodiment, although this could be first compressor 3 or second compressor 3a in other embodiments. Heat is transferred from the hot store 12b to the third expander to heat the third compressed air received at the third expander 7b before and/or during expansion. The third compressed air undergoes a first expansion at the third expander 7b.

Use of the heat from the thermal fluid at the second heat transfer device 14b causes the thermal fluid to cool. The cold (reduction in heat) is therefore transferred from the second heat transfer device 14b to the cold store 16b for storage via the fluid conduit 15b.

The first expanded air is passed to the second expander 7a via the fluid conduit 6a. The expansion ratio of the second expander 7a is selected to match the compression ratio of the compressor with which it shares a heat store. As mentioned above, this could be the compressor 3a as in the pictured embodiment, although this could be first compressor 3 or third compressor 3b in other embodiments.

Heat is transferred from the hot store 12a to the second expander 7a to heat the first compressed air received at the second expander 7a before and/or during expansion. The first expanded air undergoes a second expansion at the second expander 7a.

Use of the heat from the thermal fluid at the second heat transfer device 14a causes the thermal fluid to cool. The cold is therefore transferred from the second heat transfer device 14a to the cold store 16a for storage via the fluid conduit 15a.

The second expanded air is passed to the third expander 7 via the fluid conduit 6. The expansion ratio of the first expander 7 is selected to match the compression ratio of the compressor with which it shares a heat store. As mentioned above, this could be compressor 3 as in the pictured embodiment, although this could be the second compressor 3a or third compressor 3b in other embodiments.

Heat is transferred from the hot store 12 to the first expander 7 to heat the first compressed air received at the first expander 7a before and/or during expansion. The second expanded air undergoes a third expansion at the first expander 7.

Use of the heat from the thermal fluid at the second heat transfer device 14 causes the thermal fluid to cool. Cold is therefore transferred from the second heat transfer device 14 to the cold store 16 for storage via the fluid conduit 15.

The third expanded air leaves the energy storage apparatus via the outlet 9.

In some embodiments, there may be further energy storage sub-systems without heat extraction (for instance without a hot thermal store or a cold thermal store or any heat exchanger), between the energy storage sub-systems 18, 18a, 18b, comprising one or more compressors in parallel and/or one or more expanders in parallel.

In some embodiments, the compressors may form part of an input transducer and the expanders may form part of an output transducer. The input transducer may comprise one or more motors, and the output transducer may comprise one or more generators. In each case, the motor of an input transducer may be the generator of an output transducer operating in a different mode. Alternatively, the compressors may be connected directly to other equipment/arrangements that drive them (e.g. direct drive from a water turbine to the compressor), and likewise the work done by the expanders may be driving something other than a generator. They may form such transducers by connecting one or more compressors and/or expanders with a generator and/or motor and/or motor generator and/or other transducer type.

In some embodiments, the thermal store (i.e. what retains the heat in the thermal store) may differ from the thermal transfer fluid (named thermal fluid above) passing through the conduits and heat exchangers. For instance, the thermal store could be a solid, or may contain a phase-change material. In this case, some means of transferring heat from the thermal transfer fluid to the thermal store may be provided for. Examples are a fluid transferring heat into a solid (e.g. ceramic) store by passing through capillaries in the thermal store. Similar arrangements (or heat exchangers) could be used if the thermal storage medium is a fluid.

While the compression ratio(s) of the compression stage (s) are desirably matched with the expansion ratio(s) of the expansion stage(s) to which they are connected by a TES/thermal store, they do not need to be matched with those of other stages.

In such an arrangement there is a plurality of TES fluid storage units with pipework, pumps, valves and other equipment arranged according to well-known principles to ensure smooth, safe and controllable operation of the plant. There may be an equal number of TES fluid storage units as the number of substantially matched compression/expansion stages, or one TES fluid storage unit may supply a plurality of substantially matched compression/expansion stages.

As shown in FIG. 3, an optional supplementary heating arrangement 19, 19a, 19b is depicted in a location suited to heating the expanded air after exiting the expansion means i.e. expander. This is an alternative configuration to those above which depict such heating as acting upon either the fluid or the air either prior to entry into the expander or during expansion.

As already mentioned, this embodiment depicts compression of the air or other process gas in three stages (other numbers of stages are possible), and the expansion of the air similarly in three stages. Ideally and beneficially, the compressor's compression ratio of each stage should be approximately matched with the expander's expansion ratio of that same stage. In this embodiment, each stage has its own thermal storage subsystem, such thermal subsystem incorporating at least a hot thermal store, a thermal fluid, a means of transferring heat from the air or process gas into the thermal fluid during compression, and a means of transferring heat from the thermal fluid to the air or other process gas during expansion.

Optionally, if one or more of the stages is matched with another stage, these stages may optionally share hot and/or cold storage, and/or thermal fluid.

In any of the embodiments or examples, the energy being converted into compressed air and heat energy (by a compressor) could be any form of energy such as (but not restricted to) any one or more of the following:

Electricity, at high power such as from an electricity, power station or other generating device;

Electricity, at low power such as from photovoltaic cells, regenerative braking or other such source;

Mechanical energy such as from the movement of a vehicle, turbine or other equipment;

Kinetic energy such as the movement of an object;

Chemical energy such as from a battery, a chemical reaction or a fuel cell;

Fluid energy such as from a dam or reservoir, or flowing water or gas or other fluid;

Potential energy such as from an elevated body whose descent is used to provide the energy used for compression.

In any of the embodiments or examples, the energy being converted from compressed air and heat energy (by an expander) could be any form of energy such as (but not restricted to) any one or more of the following:

Electricity, at high power such as to put into an electricity grid, network, heating system, or equipment;

Electricity, at low power such as to use in a vehicle, low powered equipment, or lighting;

Mechanical energy such as to use to enhance the movement of a vehicle, turbine, ship or other equipment;

Kinetic energy such as the movement of an object;

Chemical energy such as to charge a battery, support a chemical reaction or charge a fuel cell;

Fluid energy such as to refill a dam or reservoir, or power a ship or other water-borne device or gas or other fluid;

Potential energy such as raising a body.

In any of these embodiments or examples, the optional supplementary heating may be situated in other locations, such as between the heat exchanger/transfer device and the expander.

In all the figures, the heat exchanger/transfer device is drawn as adjoining the compressor or expander respectively, and the supplementary heating as adjoining either the heat exchanger/transfer device or the expander. Any or all of these may be separated, fluidly coupled in order to permit the TES fluid and/or the air (as appropriate to the embodiment) to flow between the units.

In all the figures the expander is drawn as being different from the compressor. Optionally they may be the same unit operating in different modes.

In some embodiments, the heat transfer devices may be a heat exchanger or intercooler/interheater. In all these embodiments the heat exchanger/intercooler relating to the compressor may be different from the heat exchanger/interheater relating to the expander. Optionally they may be the same unit operating in different modes.

In all these figures the TES fluid is depicted as both transferring the heat to/from each of the thermal stores and storing the heat. Optionally the storage of the heat could be in a different apparatus such as but not restricted to ceramic heat storage, or heat storage in any other solid, or in any other material or equipment.

Figure 4:
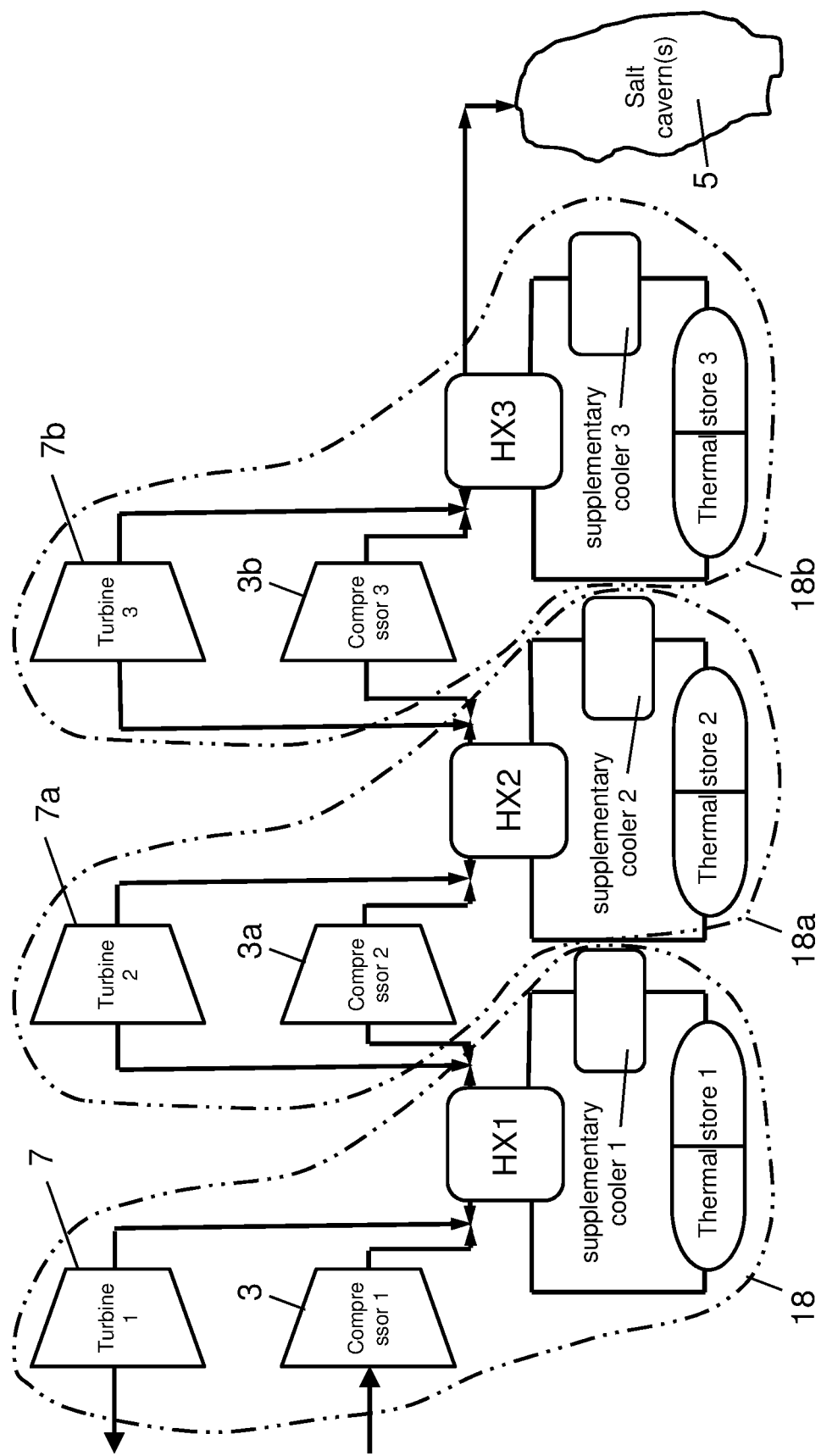
FIG. 4 shows a schematic diagram of an embodiment of an energy storage apparatus as in FIG. 3, but with supplementary cooling in each subsystem after storage of the cold fluid, and also depicting storage wherein the hot and cold fluid occupy different parts of the same storage.

FIG. 4 depicts a similar energy storage apparatus to that of FIG. 3.

However, in this embodiment, rather than each of the plurality of energy storage sub-systems comprising a hot store 12 and a cold store 16, each of the plurality of energy storage sub-systems comprises a single thermal store that has a hot portion or side, and a cold portion or side, perhaps by use of a thermocline or any other suitable method of separation.

Although the thermal stores are shown in the figure as being split into two parts, hot and cold, the boundary between the two parts may move during operation. The stores may be either multiple stores with each tank holding either hot-only or hot-and-air or cold-and-air or cold-only (i.e. not hot-and-cold), with or without one or more vacant tanks in the system, or they may be one or more tanks holding hot-and-cold with thermoclines between the two zones. In either case, the apparatus may include an arrangement to accommodate expansion of the thermal storage fluid, such as but not limited to one or more expansion tanks. Such expansion may be arranged so as to maintain the requisite pressure in the thermal stores.

Also, in this embodiment, rather than each of the plurality of energy storage sub-systems comprising first 10, 10a, 10b and second 14, 14a, 14b heat transfer devices, each of the plurality of energy storage sub-systems comprises a heat exchanger HX1, HX2, HX3. The heat exchanger HX1, HX2, HX3 can be used for both purposes of extracting heat generated during compression of incoming air in each of the compressors 3, 3a, 3b and transferring cold to the air to be expanded in each of the expanders 7, 7a, 7b.

In this embodiment, the air flow may be directed by valves with the heat exchangers HX1, HX2, HX3 operating forwards or in reverse depending on whether they are transferring hot or cold to a particular compressor/expander. This may save on operating costs.

If common heat exchangers are used as shown in FIG. 4, then whether the conduits transfer hot or cold depends on whether the apparatus is charging or discharging the air (process gas) store, i.e. whether the apparatus is compressing or expanding. If we use separate heat exchangers for the compression train and for the expansion train, then at least some of the conduit will be dedicated to transferring heat, and other parts dedicated to transferring cold (i.e. removing heat).

FIG. 4 shows each of the plurality of energy storage sub-systems comprising an optional supplementary cooler. The cooler cools (i.e. removes heat) from cold received from the thermal store for being transferred to incoming air received at the compressor to be compressed. The additional cooling provided by the cooler may help to overcome inherent thermodynamic inefficiency within the system.

The compressed gas store 5 is shown in this embodiment is a salt cavern, but may be any appropriate structure capable of holding compressed process fluid, whether geological or otherwise.

Figure 5:
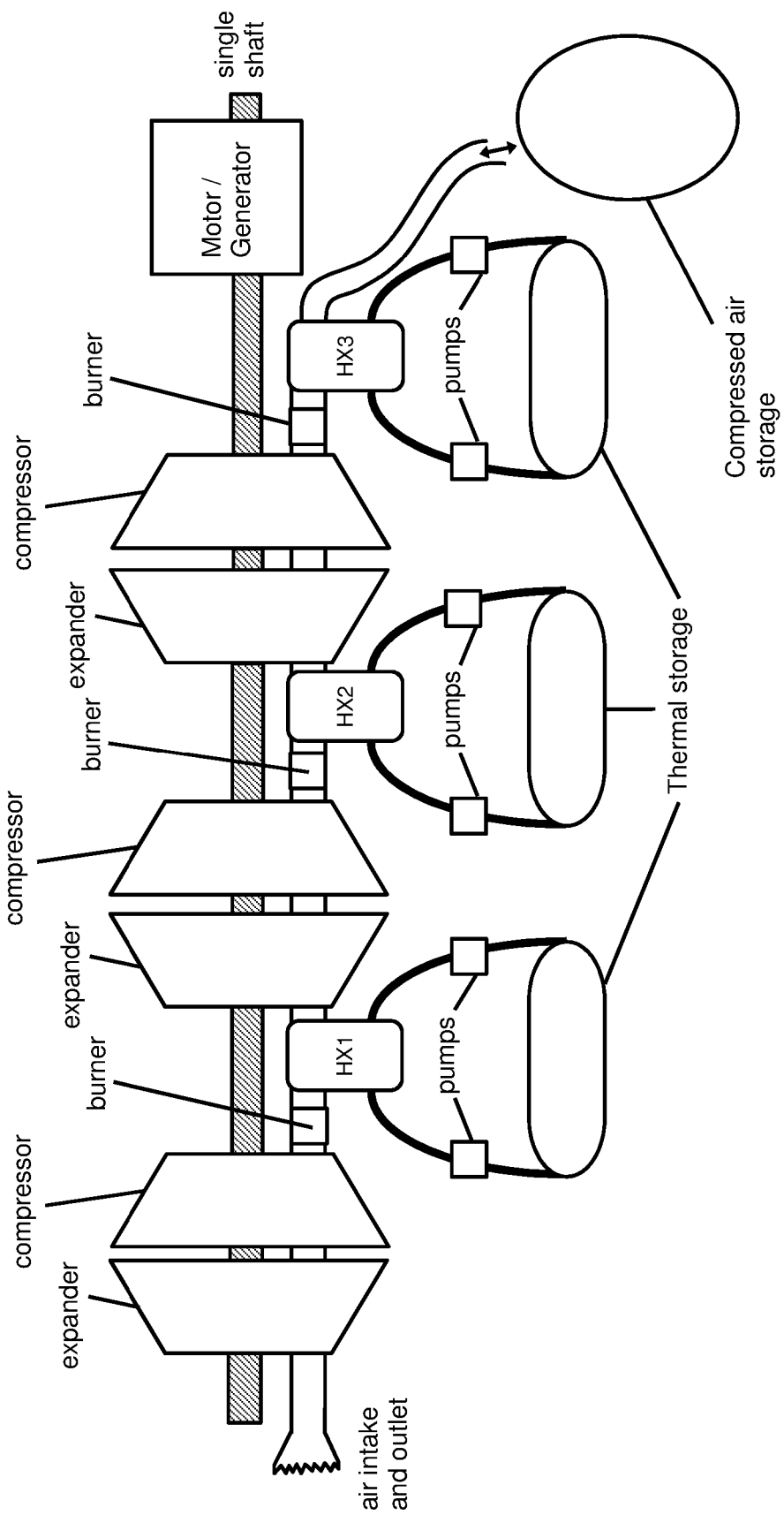
FIG. 5 shows a schematic diagram of another embodiment of the energy storage apparatus of FIG. 4 wherein all compressors and expanders are mounted on a single shaft.

FIG. 5 depicts a similar energy storage apparatus to that of FIG. 3. However, in this embodiment, the compressors and expanders in each of the plurality of energy storage sub-systems are arranged on a single shaft, connected to a single motor/generator. The compressors and expanders may be connected to the single shaft by use of clutches. This results in a relatively compact arrangement with a reduced number of moving parts.

In any of the embodiments described, as well as in other potential embodiments of the invention, the compressors may be on the same shaft(s)/connected to the same motor(s) as the expanders, or they may be on separate shaft(s)/connected to different motor(s) from the expanders. In the former embodiment they may be connected via clutch mechanisms to economise on the capital cost of the apparatus. In one example (among many) of the latter embodiment, each train can be spun like a flywheel when not being used to compress/generate, thereby (a) keeping the train synchronised to the grid, (b) keeping the train warm and reducing the start-up inertia, and (c) provide increased and (more) constant natural inertia and reactive power, yielding many benefits in grid stability—and all of these (1) increase the number of grid services provided by the plant and hence (2) potential revenue streams and (3) benefits to the system. In addition it is within the scope of the invention for a compressor of each subsystem to be independent or for it to be mechanically linked (e.g. by a shaft) to a compressor of one or more of the other subsystems. Likewise, it is within the scope of the invention for an expander of each subsystem to be independent or for it to be mechanically linked (e.g. by a shaft) to an expander of one or more of the other subsystems.

The thermal stores shown may be only hot stores, in which case the heat exchangers shown are for a single purpose of transferring hot between the compressors/expanders and the thermal stores, and there are no cold stores present in the energy storage apparatus. Alternatively, the thermal stores shown may be single thermal stores that have a hot portion or side, and a cold portion or side, perhaps by use of a thermocline, in which case the heat exchangers shown are dual purpose, for transferring both hot and cold between the compressors/expanders and the thermal stores.

There may be sensors at various points in the system, for instance monitoring air flow, mechanical properties of the system and/or mechanical properties of the system. There may be any one of more of the following sensors present in the system, including temperature, pressure, moisture, gas content, vibration, speed, torque, power in/out, voltage and frequency. This may help ensure smooth operation and prevent or help detect any faults.

The burners shown in FIG. 5 may be additional heating units for heating incoming air received at each of the expanders prior to and/or during expansion.

Further Options and Variants

In any embodiment or example, the TES fluid/thermal energy fluid could be either a gas or a liquid. The selection of gas or liquid would be made subject to various considerations such as, but not restricted to, one or more of: the preferred containment means, the piping or transportation means, the ease of heat transfer to and from the TES fluid, the nature of the TES fluid itself, and the failsafe or containment systems in case of failure of any item of equipment.

In any of these embodiments or examples, factors that may be considered under the title of the nature of the TES fluid/thermal energy fluid itself may include, but not be restricted to, one or more of: the heat capacity of the TES fluid at the operational temperatures, its boiling point, its corrosiveness, its flammability or explosiveness, its usefulness for other purposes such as in a fuel cell, its cost, the cost and means of its disposal, and any aspect(s) of its environmental friendliness.

In any embodiment or example, the TES fluid/thermal energy fluid could be a gas at the elevated temperature and a liquid at the lower temperature in order to store a greater amount of energy per degree increase in temperature by dint of the latent heat of vaporisation.

Optionally, the hot fluid would be stored in one or more insulated containment vessels. Such an embodiment could be fixed or mobile, large or small, and of variable (such as using a bladder) or fixed size.

In any embodiment or example, storing the hot fluid in one or more insulated containment vessels, the entire system could be fitted onto a mobile device such as a platform, ship or vehicle.

In an alternative embodiment or example, the hot fluid would be stored in one or more underground caverns. In this case, one suitable fluid would be brine which would reduce ongoing cavern erosion. Other fluids could be used though attention would then need to be given to the interaction of the TES fluid/thermal energy fluid with the cavern.

Other embodiments or examples are possible, for example but not limited to containment of the hot fluid in a bladder or rock formation such as the porous subterranean formations that contain natural gas.

In any embodiment or example, after being used to the TES fluid/thermal energy fluid may be stored in a second storage means, at a lower temperature than the first. Then this cold fluid may be used again for taking heat energy from the means of compression. This would form a closed cycle for the TES fluid/thermal energy fluid in which the TES fluid/thermal energy fluid may be used any number of times.

In any of these embodiments or examples, the TES fluid/thermal energy fluid may be water (or brine or another suitable liquid) when cold, and superheated water (or other suitable liquid) when hot. In this case, the temperature of the hot reservoir would be below 300° C., and ideally or preferably between 150° C. and 250° C., and to operate at cost-effective pressures. Other fluids may be maintained in their liquid state, under pressure, at temperatures up to 500° C.

Ideally or optionally the temperatures of the TES fluid/thermal energy fluid would be selected so as to ensure that the thermal subsystem is most cost-effective. This may optionally entail thermal subsystem pressures of up to 30 bar, optionally 10-25 bar. This would in turn entail selecting compression and expansion ratios of the compressor and expander that would generate (and absorb, respectively) heat at a rate compatible with the thermal fluid storing such heat at such pressures.

In any of these embodiments or examples, the TES fluid/thermal energy fluid may be a saline solution such as brine, which may have the benefits of raising the boiling point of the TES fluid/thermal energy fluid and hence the pressure at which it must be contained at any required temperature, while having a specific heat capacity greater than most other fluids.

Optionally and beneficially, such a system would incorporate between three and five stages of compression, and an equal number of stages of expansion.

Such a system may optionally use one thermal management subsystem per compression stage, shared with a corresponding expansion stage, as for instance is shown in FIG. 3. Or the thermal management subsystem may be common to any number of compression and expansion stages, for instance each of the plurality of energy storage sub-systems may comprise two (or more) compressors arranged in parallel, and/or two (or more) expanders arranged in parallel.

The number of compressors and expanders in each of the plurality of energy storage sub-systems may be equal. The energy storage apparatus may comprise two, three, four, five, six or more energy storage sub-systems arranged in series.

Depending on the air or other process gas pressure range and on the desired pressure range of the thermal fluid, beneficially such a system may incorporate between three and five stages of each of compression and expansion.

Optionally, one compressor or set of compressors may be employed to pressurise the cavern up to working pressures, for example increasing the pressure from 1 bar in a single stage or multiple stages to 30-40 bar (as will be appreciated, other pressures may be used), while a wholly or partially different compressor or set of compressors may be employed for normal operations, for example from 30-100 bar to 60-200 bar (as will be appreciated, other pressures may be used). The lower pressure compressor or set of compressors may be employed to bring the pressure up from any low pressure to any higher pressure. Such an arrangement may enable the operating compressor or set of compressors to be optimised to a range of pressures at which it operates more efficiently.

Optionally, a low pressure compressor or set of compressors may operate in a de-couplable manner in conjunction with a higher pressure compressor or set of compressors.

Optionally, a low pressure compressor or set of compressors may be both de-couplable from a higher pressure compressor or set of compressors, and removed during normal operations. Such low pressure compressor or set of compressors may optionally be used to pressurise another storage means, or be used for another purpose, or be worked on for example for maintenance or upgrading purposes.

Optionally and beneficially, the compression means/compressor may be one or more rotating compressors.

Optionally and beneficially, the expansion means/expander may be one or more rotating expanders or turbines.

Optionally the extreme cooling created by the expansion of the compressed air or other process gas may be used as an output in itself, for example to distil various elements from air or from some other such mixture of fluids; to freeze objects and products rapidly; to preserve cold environments; to power heat pumps; to generate thermoelectric current; to create and/or maintain superconductivity; for air conditioning; and so on.

Optionally a supplementary heat source may be used to supplement the stored heat. This would enable energy to be extracted from the system at other places, and/or the recovery of losses and inefficiencies within the system, and/or supplementary heating of the air or process gas in order to increase the amount of energy produced from a given amount of air or other process gas. Such supplementary heat source may include one or more of thermal concentrator (including but not limited to a flat or shaped mirror arrangement, or lens arrangement), a heat pump, a solar thermal device, or a combustion process.

Optionally a supplementary means of cooling may be used to supplement the cooling by the thermal fluid. Such supplementary means of cooling may optionally provide heat to another process or application.

Optionally and beneficially the compression ratios of the compressors are selected to maintain the temperature of the air or other process gas below 500° C., optionally below 350° C., optionally below 250° C. In general, lower temperatures require lower pressures of the thermal fluid and thermal subsystem.

In some embodiments, the thermal subsystem is defined as incorporating at least a hot thermal store, a thermal fluid, a means of transferring heat from the air or process gas into the thermal fluid during compression, and a means of transferring heat from the thermal fluid to the air or other process gas during expansion.

Optionally the thermal storage stores both hot and cold fluid, with stratification of different temperature fluid, and/or a thermocline, and/or a float that separates the hotter fluid from the cooler fluid.

Benefits of Embodiments of the Invention

An advantage of storing the heat from compression to re-use during expansion is that additional energy is not required during expansion to prevent freezing or localised changes to atmospheric conditions. This in turn improves the efficiency of the system and reduces its operating costs.

Heat storage and re-use also enables the use of a wider range of types of expander, as they do not have to operate under such cold conditions.

One advantage of embodiments of the energy storage apparatus where heat is stored in a fluid, over a system that stores heat in solids, is that there are fewer heat transfer activities in each direction, making it more efficient. Another advantage over solid heat stores is that the heat energy is more easily stored from the system and recovered from the store to put back into the system, owing to the flow characteristics (either by convection alone or with additional propulsion or assistance) of fluids.

The above embodiments and examples are provided by way of example only. Many variations are possible without departing from the scope of the invention as defined in the appended claims.

This description provides some examples of ways this invention can be implemented, including some preferred examples, to enable any person skilled in the art to practice the invention, including making and using any devices or systems and performing any incorporated methods. The scope of the invention is defined by the appended claims, which scope may cover other examples that occur to those skilled in the art and that are not explicitly disclosed herein. Other examples are intended to be within the scope of the claims if they have structural elements that do not differ from the literal language of the claims, or if they include equivalent structural elements with insubstantial differences from the literal languages of the claims.

The invention claimed is:

1. An energy storage apparatus comprising:
   at least one inlet for incoming process gas;
   at least one outlet for expanded process gas; and
   a plurality of energy storage sub-systems configured to be arranged in series with each other and with a compressed gas store;
   wherein a first one of the plurality of energy storage sub-systems comprises:
      at least a first compressor;
      at least a first expander;
      at least a first thermal store; and
      at least a first heat transfer device associated with the first thermal store; and
   wherein a second one of the plurality of energy storage sub-systems comprises:
      at least a second compressor;
      at least a second expander;
      at least a second thermal store; and
      at least a second heat transfer device associated with the second thermal store,
   wherein the first heat transfer device is configured to transfer heat generated by compression of the process gas in either the first or the second compressor to the first thermal store for storing the heat in the first thermal store, and wherein the first heat transfer device is configured to transfer heat from the first thermal store to process gas received at the first or the second expander;
   and wherein the second heat transfer device is configured to transfer heat generated by compression of the process gas in the first or the second compressor to the second thermal store for storing the heat in the second thermal store, and wherein the second heat transfer device is configured to transfer heat from the second thermal store to process gas received at the first or the second expander;
   and wherein:
   the first compressor is configured to provide a first compression to incoming process gas received from the at least one inlet and to supply a first compressed process gas to the second compressor;
   the second compressor is configured to provide a second compression to the first compressed process gas received from the first compressor and to supply a second compressed process gas to the compressed gas store;

the second expander is configured to provide a first expansion to the second compressed process gas received from the compressed gas store and to supply a first expanded process gas to the first expander; and the first expander is configured to provide a second expansion to the first expanded process gas received from the second compressor and to supply a second expanded process gas to the at least one outlet;

each compressor forming part of an input transducer configured to convert an input energy to compressed process gas and each expander forming part of an output transducer configured to convert compressed process gas to an output energy;

wherein a compression ratio of the first compressor is substantially equal to an expansion ratio of the first expander, and wherein a second compression ratio of the second compressor is substantially equal to a second expansion ratio of the second expander.

2. The energy storage apparatus of claim 1, wherein the first heat transfer device is configured to transfer heat generated by compression of the process gas in the first compressor via a first heat transfer conduit to the first thermal store for storing the heat in the first thermal store, and wherein the first heat transfer device is configured to transfer heat from the first thermal store to process gas received at the first expander via the first heat transfer conduit; and wherein the second heat transfer device is configured to transfer heat generated by compression of the process gas in the second compressor via a second heat transfer conduit to the second thermal store for storing the heat in the second thermal store, and wherein the second heat transfer device is configured to transfer heat from the second thermal store to process gas received at the second expander via the second heat transfer conduit.

3. The energy storage apparatus of claim 1, wherein the first heat transfer device is configured to transfer heat generated by compression of the process gas in the first compressor to the first thermal store for storing the heat in the first thermal store, and wherein the first heat transfer device is configured to transfer heat from the first thermal store to process gas received at the second expander; and, optionally, wherein the compression ratio of the first compressor is substantially equal to the second expansion ratio of the second expander;

and/or wherein the second heat transfer device is configured to transfer heat generated by compression of the process gas in the second compressor to the second thermal store for storing the heat in the second thermal store, and wherein the second heat transfer device is configured to transfer heat from the second thermal store to the first expanded process gas received at the first expander; and, optionally, wherein the compression ratio of the second compressor is substantially equal to the expansion ratio of the first expander.

4. The energy storage apparatus of claim 1, wherein the energy storage apparatus is configured to selectively change the heat transfer communication between the compressors, the expanders, and the heat transfer devices, such that the first compressor and/or the first expander are selectively operable to be in heat transfer communication with the first heat transfer device or the second heat transfer device, and wherein the second compressor and/or the second expander are selectively operable to be in heat transfer communication with the first heat transfer device or the second heat transfer device.

5. The energy storage apparatus of claim 1, wherein the first and second thermal stores are thermal fluid stores for holding a thermal energy fluid for storing heat, and wherein said transfer of heat by the first and second heat transfer devices comprises movement of said thermal energy fluid along one or more conduits carrying said thermal energy fluid;

and, optionally, wherein the thermal energy fluid is water.

6. The energy storage apparatus of claim 1, wherein the first thermal store and the second thermal store are pressurised, optionally at a pressure of 10-30 bar, optionally at a pressure of 15-25 bar, optionally at a pressure of 18-22 bar.

7. The energy storage apparatus of claim 1, wherein the first thermal store comprises a first hot portion and a first cold portion, wherein the first heat transfer device is configured to transfer heat generated by compression of the process gas in one of the compressors to the first hot portion, and wherein the first heat transfer device is configured to transfer cold from the first cold portion to the process gas output by one of the compressors for cooling the process gas; and/or wherein the second thermal store comprises a second hot portion and a second cold portion, wherein the second heat transfer device is configured to transfer heat generated by compression of the process gas in one of the compressors to the second hot portion, and wherein the second heat transfer device is configured to transfer cold from the second cold portion to the process gas output by one of the compressors for cooling the process gas.

8. The energy storage apparatus of claim 1, wherein the first heat transfer device comprises a first cooler configured to receive heat from the first thermal store and reduce said heat from the first thermal store before supplying it to process gas during or after the process gas passes through one of the compressors; and/or wherein the second heat transfer device further comprises a second cooler configured to receive heat from the second thermal store and reduce said heat received from the second thermal store before supplying to process gas during or after the process gas passes through one of the compressors.

9. The energy storage apparatus of claim 8, wherein the first cooler is configured to receive heat from the first cold portion, and/or wherein the second cooler is configured to receive heat from the second cold portion.

10. The energy storage apparatus of claim 1, wherein the first compressor and the second compressor are mechanically linked to one another by a first linkage, and/or wherein the first expander and second expander are mechanically linked to one another by a second linkage, or optionally wherein the first and second compressors and the first and second expanders are all mechanically linked by a first linkage.

11. The energy storage apparatus of claim 1, wherein the first heat transfer device comprises a first heat exchanger and a second heat exchanger, wherein the first heat exchanger is configured to transfer heat generated by compression of the process gas in either the first or the second compressor to the first thermal store for storing the heat in the first thermal store, and wherein the second heat exchanger is configured to transfer heat from the first thermal store to process gas received at the first or the second expander;

and/or wherein the second heat transfer device comprises a third heat exchanger and a fourth heat exchanger, wherein the third heat exchanger is configured to transfer heat generated by compression of the process gas in either the first or the second compressor to the second thermal store for storing the heat in the second thermal store, and wherein the fourth heat exchanger is configured to transfer heat from the second thermal store to process gas received at the first or the second expander.

12. The energy storage apparatus of claim 1, wherein the energy storage apparatus comprises a further energy storage sub-system comprising:
- at least a further compressor;
- at least a further expander;
- at least a further thermal store; and
- at least a further heat transfer device associated with the further thermal store, wherein the further heat transfer device is configured to transfer heat generated by compression of the process gas by either the first, the second or the further compressor to the further thermal store for storing in the further thermal store, and wherein the further heat transfer device is configured to transfer heat from the further thermal store to process gas received at the first, the second or the further expander;

and wherein:
- the first compressor is configured to supply said first compressed process gas to the second compressor via the further compressor, the further compressor configured to further compress the first compressed process gas before it is supplied to the second compressor;
- the second expander is configured to supply said first expanded process gas to the first expander via the further expander, the further expander configured to further expand the first expanded process gas before it is supplied to the first expander.

13. A method of storing energy using an energy storage apparatus, the energy storage apparatus comprising:
- at least one inlet for incoming process gas;
- at least one outlet for expanded process gas; and
- a plurality of energy storage sub-systems configured to be arranged in series with each other and with a compressed gas store;
- wherein a first one of the plurality of energy storage sub-systems comprises:
  - at least a first compressor;
  - at least a first expander;
  - at least a first thermal store; and
  - at least a first heat transfer device associated with the first thermal store; and
- wherein a second one of the plurality of energy storage sub-systems comprises:
  - at least a second compressor;
  - at least a second expander;
  - at least a second thermal store; and
  - at least a second heat transfer device associated with the second thermal store,
- wherein each compressor forms part of an input transducer and each expander forms part of an output transducer;
- wherein the method comprises:
  - an input energy being supplied to said input transducer;
  - the first compressor providing a first compression to incoming process gas received from the at least one inlet and supplying a first compressed process gas to the second compressor;
  - one of the first and second heat transfer devices transferring heat generated by compression of the process gas in the first compressor to its associated thermal store for storing the heat in the associated thermal store;
  - the second compressor providing a second compression to the first compressed process gas received from the first compressor and supplying a second compressed process gas to the compressed gas store;
  - one of the first and second heat transfer devices transferring heat generated by compression of the process gas in the second compressor to its associated thermal store for storing the heat in the associated thermal store;
  - one of the first and second heat transfer devices transferring heat from its associated thermal store to the second compressed process gas received at the second expander from the compressed gas store;
  - the second expander providing a first expansion to the second compressed process gas received from the compressed gas store and supplying a first expanded process gas to the first expander;
  - one of the first and second heat transfer devices transferring heat from its associated thermal store to the first compressed process gas received at the first expander from the second expander;
  - the first expander providing a second expansion to the first expanded process gas received from the second expander and supplying a second expanded process gas to the at least one outlet; and
  - said output transducer outputting an output energy;
- wherein a compression ratio of the first compressor is substantially equal to an expansion ratio of the first expander, and wherein a second compression ratio of the second compressor is substantially equal to a second expansion ratio of the second expander.

14. The method of claim 13,
wherein the first heat transfer device is configured to transfer heat generated by compression of the process gas in the first compressor via a first heat transfer conduit to the first thermal store for storing the heat in the first thermal store, and wherein the first heat transfer device is configured to transfer heat from the first thermal store to process gas received at the first expander via the first heat transfer conduit; and
wherein the second heat transfer device is configured to transfer heat generated by compression of the process gas in the second compressor via a second heat transfer conduit to the second thermal store for storing the heat in the second thermal store, and wherein the second heat transfer device is configured to transfer heat from the second thermal store to process gas received at the second expander via the second heat transfer conduit;
and wherein the method comprises:
the first heat transfer device transferring heat generated by compression of the process gas in the first compressor via the first heat transfer conduit to the first thermal store for storing the heat in the first thermal store;
the second heat transfer device transferring heat generated by compression of the first compressed process gas in the second compressor via the second heat transfer conduit to the second thermal store for storing the heat in the second thermal store;
the second heat transfer device transferring heat from the second thermal store to the second compressed process gas received at the second expander from the compressed gas store via the second heat transfer conduit; and the first heat transfer device transferring heat from the first thermal store to the first expanded process gas received at the first expander from the second expander via the first heat transfer conduit.

15. The method of claim 13, wherein the first heat transfer device transfers heat generated by compression of the process gas in the first compressor to the first thermal store for storing the heat in the first thermal store, and wherein the first heat transfer device transfers heat from the first thermal store to process gas received at the second expander; and, optionally, wherein the compression ratio of the first compressor is substantially equal to the second expansion ratio of the second expander;

and/or wherein the second heat transfer device transfers heat generated by compression of the process gas in the second compressor to the second thermal store for storing the heat in the second thermal store, and wherein the second heat transfer device transfers heat from the second thermal store to the first expanded process gas received at the first expander; and, optionally wherein the second compression ratio of the second compressor is substantially equal to the expansion ratio of the first expander.

16. The method of claim 13, wherein the energy storage apparatus is configured to selectively change the heat transfer communication between the compressors, the expanders, and the heat transfer devices, such that the first compressor and/or the first expander are selected to be in heat transfer communication with the first heat transfer device or the second heat transfer device, and wherein the second compressor and/or the second expander are selected to be in heat transfer communication with the first heat transfer device or the second heat transfer device.

17. The method of claim 13, wherein the first and second thermal stores are thermal fluid stores for holding a thermal energy fluid for storing heat, and wherein said transfer of heat by the first and second heat transfer devices comprises movement of said thermal energy fluid along one or more conduits carrying said thermal energy fluid, and, optionally wherein the thermal energy fluid is water.

18. The method of claim 13, wherein the first thermal store and the second thermal store are pressurised, optionally at a pressure of 10-30 bar, optionally at a pressure of 15-25 bar, optionally at a pressure of 18-22 bar; and wherein the method further comprises pressurising the first thermal store and the second thermal store.

19. The method of claim 13, wherein the first thermal store comprises a first hot portion and a first cold portion, and wherein the first heat transfer device transfers heat generated by compression of the process gas in one of the compressors to the first hot portion, and wherein the first thermal store transfers cold from the first cold portion to the process gas output by one of the compressors for cooling the process gas; and/or wherein the second thermal store comprises a second hot portion and a second cold portion, wherein the second heat transfer device transfers heat generated by compression of the process gas in one of the compressors to the second hot portion, and wherein the second heat transfer device transfers cold from the second cold portion to the process gas output by one of the compressors for cooling the process gas.

20. The method of claim 13, wherein the first heat transfer device comprises a first cooler which receives heat from the first thermal store and reduces said heat received from the first thermal store before supplying it to the process gas during or after it passes through one of the compressors; and/or wherein the second heat transfer device further comprises a second cooler which receives heat from the second thermal store and reduces said heat received from the second thermal store before supplying to process gas during or after it passes through one of the compressors.

21. The method of claim 20, wherein the first cooler receives heat from the first cold portion, and/or wherein the second cooler receives heat from the second cold portion.

22. The method of claim 13, wherein the first compressor and the second compressor are mechanically linked to one another and the by a first linkage, and/or wherein the first expander and second expander are mechanically linked to one another by a second linkage, or optionally wherein the first and second compressors and the first and second expanders are all mechanically linked by a first linkage.

23. The method of claim 13, wherein the first heat transfer device comprises a first heat exchanger and a second heat exchanger, wherein the first heat exchanger is configured to transfer heat generated by compression of the process gas in either the first or the second compressor to the first thermal store for storing the heat in the first thermal store, and wherein the second heat exchanger is configured to transfer heat from the first thermal store to process gas received at the first or the second expander;

and/or wherein the second heat transfer device comprises a third heat exchanger and a fourth heat exchanger, wherein the third heat exchanger is configured to transfer heat generated by compression of the process gas in either the first or the second compressor to the second thermal store for storing the heat in the second thermal store, and wherein the fourth heat exchanger is configured to transfer heat from the second thermal store to process gas received at the first or the second expander;

wherein the method comprises:

one of the first and third heat exchangers transferring heat generated by compression of the process gas in the first compressor to its associated thermal store for storing the heat in the associated thermal store;

one of the first and third heat exchangers transferring heat generated by compression of the process gas in the second compressor to its associated thermal store for storing the heat in the associated thermal store;

one of the second and fourth heat exchangers transferring heat from its associated thermal store to the second compressed process gas received at the second expander from the compressed gas store; and/or one of the second and fourth heat exchangers transferring heat from its associated thermal store to the first compressed process gas received at the first expander from the second expander.

24. The method of claim 13, wherein the energy storage apparatus comprises a further energy storage sub-system comprising:

at least a further compressor;
at least a further expander;
at least a further thermal store; and
at least a further heat transfer device associated with the further thermal store, wherein the further heat transfer device transfers heat generated by compression of the process gas by either the first, the second or the further compressor to the further thermal store for storing the heat in the further thermal store, and wherein the further heat transfer device transfers heat from the further thermal store to process gas received at the first, the second or the further expander; and wherein:

the first compressor supplies said first compressed process gas to the second compressor via the further compressor, the further compressor further compressing the first compressed process gas before it is supplied to the second compressor;

the second expander supplies said first expanded process gas to the first expander via the further expander, the further expander further expanding the first expanded process gas before it is supplied to the first expander.

* * * * *